(12) United States Patent
Simone et al.

(10) Patent No.: US 11,945,041 B2
(45) Date of Patent: Apr. 2, 2024

(54) INTEGRATED ELECTRODE MAINTENANCE FOR ROBOTIC WELDING CELL INCLUDING CAP EXTRACTOR

(71) Applicant: Doben Limited, Windsor (CA)

(72) Inventors: David M. Simone, Amherstburg (CA); Daniel P. Vanderzwet, Omemee (CA); Philip W. Brown, Leamington (CA)

(73) Assignee: DOBEN LIMITED, Windsor (CA)

( * ) Notice: Subject to any disclaimer, the term of this patent is extended or adjusted under 35 U.S.C. 154(b) by 784 days.

(21) Appl. No.: 17/116,695

(22) Filed: Dec. 9, 2020

(65) Prior Publication Data
US 2021/0086289 A1  Mar. 25, 2021

Related U.S. Application Data

(63) Continuation of application No. PCT/CA2018/050702, filed on Jun. 12, 2018.

(51) Int. Cl.
| | |
|---|---|
| B23K 11/30 | (2006.01) |
| B23K 11/11 | (2006.01) |
| B23K 11/25 | (2006.01) |
| B23K 11/31 | (2006.01) |
| B23Q 3/155 | (2006.01) |

(52) U.S. Cl.
CPC ........ B23K 11/3063 (2013.01); B23K 11/253 (2013.01); B23K 11/3072 (2013.01); B23K 11/314 (2013.01); B23Q 3/15536 (2016.11); B23Q 3/1556 (2013.01); B23K 11/115 (2013.01); B23Q 2003/155411 (2016.11)

(58) Field of Classification Search
CPC .............. B23K 11/3063; B23K 11/253; B23K 11/3072; B23K 11/314; B23K 11/115; B23Q 3/15536; B23Q 3/1556; B23Q 2003/155411

See application file for complete search history.

(56) References Cited

U.S. PATENT DOCUMENTS

| | | | | |
|---|---|---|---|---|
| 4,794,221 A | * | 12/1988 | Takabe ............... | B23K 11/3072 219/86.25 |
| 4,935,595 A | | 6/1990 | Fuse | |

(Continued)

FOREIGN PATENT DOCUMENTS

| | | |
|---|---|---|
| CN | 104416278 A | 3/2015 |
| CN | 204195663 U | 3/2015 |

(Continued)

OTHER PUBLICATIONS

Chinese Office Action for Chinese Application No. 202110229564.2 dated Feb. 28, 2022.

(Continued)

*Primary Examiner* — Brian W Jennison

(74) *Attorney, Agent, or Firm* — Carlson, Gaskey & Olds, P.C.

(57) ABSTRACT

A cap extractor for a welding gun includes a housing, a pair of springs, and first and second arms that are arranged between the springs. Each of the first and second arms have teeth that are configured to engage a welding cap. The first and second arms are configured to move relative to the housing in first and second directions that are transverse to one another by deflecting the springs.

14 Claims, 23 Drawing Sheets

(56) References Cited

U.S. PATENT DOCUMENTS

| | | | | |
|---|---|---|---|---|
| 5,073,692 | A | * 12/1991 | Jackson | B23K 11/3072 |
| | | | | 219/86.7 |
| 5,495,663 | A | 3/1996 | Saito | |
| 5,734,141 | A | * 3/1998 | Voilmy | B23K 11/3072 |
| | | | | 219/86.25 |
| 5,767,474 | A | 6/1998 | Shimada | |
| 6,049,053 | A | 4/2000 | Shimada | |
| 6,188,038 | B1 | 2/2001 | Kazuhiro | |
| 6,518,537 | B1 | * 2/2003 | Tezawa | B23K 11/3063 |
| | | | | 29/762 |
| 6,667,454 | B2 | 12/2003 | Rigaux | |
| 7,105,767 | B2 | 9/2006 | Izumi et al. | |
| 7,353,578 | B2 | 4/2008 | Nakajima et al. | |
| 8,314,356 | B2 | 11/2012 | Kaeseler | |
| 9,321,123 | B2 | 4/2016 | Ishikawa et al. | |
| 9,446,474 | B2 | 9/2016 | Yao et al. | |
| 9,505,080 | B2 | 11/2016 | Nakajima | |
| 9,745,857 | B2 | 8/2017 | Carrieres | |
| 2009/0173720 | A1 | 7/2009 | Khakhalev et al. | |
| 2010/0236060 | A1 | 9/2010 | Suzuki | |
| 2013/0306612 | A1 | 11/2013 | Snead et al. | |
| 2014/0291299 | A1 | 10/2014 | Ishikawa et al. | |
| 2015/0020382 | A1 | 1/2015 | Lee et al. | |
| 2017/0106467 | A1 | 4/2017 | Choi | |
| 2017/0282284 | A1 | * 10/2017 | Nakajima | B23K 11/3072 |
| 2018/0099348 | A1 | 4/2018 | Choi et al. | |
| 2018/0221983 | A1 | 8/2018 | Johnson et al. | |
| 2018/0369949 | A1 | * 12/2018 | Nakajima | B23K 11/36 |

FOREIGN PATENT DOCUMENTS

| | | |
|---|---|---|
| CN | 104801973 A | 7/2015 |
| CN | 104985425 A | 10/2015 |
| CN | 107520532 A | 12/2017 |
| CN | 206912962 U | 1/2018 |
| DE | 19817803 C1 | 10/1999 |
| DE | 102013214549 A1 | 1/2015 |
| EP | 2223765 A1 | 9/2010 |
| EP | 2617511 A1 | 7/2013 |
| EP | 2859988 A1 | 4/2015 |
| JP | H079166 A | 1/1995 |
| JP | 2001347380 A | 12/2001 |
| SU | 1729717 A1 | 4/1992 |
| WO | 2002094495 A1 | 11/2002 |
| WO | 2004096479 A1 | 11/2004 |

OTHER PUBLICATIONS

International Search Report and Written Opinion for International Application No. PCT/CA2018/050702 dated Mar. 1, 2019.
Chinese Office Action for Chinese Patent Application No. 201880095633.1 dated Dec. 1, 2021.
European Search Report for European Application No. 20215211.2 dated Jun. 16, 2021.
Chinese Office Action for Chinese Application No. 201880095633.1 dated Jun. 21, 2022.
European Examination Report for European Application No. 18922953.7 dated Nov. 28, 2023.
Non-Final Office Action for U.S. Appl. No. 16/973,681 dated Dec. 14, 2023.
Non-Final Office Action for U.S. Appl. No. 17/116,734 dated Mar. 30, 2023.
Final Office Action for U.S. Appl. No. 17/116,734 dated Sep. 26, 2023.
European Search Report for European Application No. 18922953.7 dated Feb. 28, 2022.

* cited by examiner

INTEGRATED ELECTRODE MAINTENANCE FOR ROBOTIC WELDING CELL INCLUDING CAP EXTRACTOR

CROSS-REFERENCE TO RELATED APPLICATIONS

The application is a continuation of PCT Application No. PCT/CA2018/050702 filed Jun. 12, 2018, and is incorporated herein by reference.

BACKGROUND

The disclosure relates to tool maintenance assembly used to remove, replace and dress the caps of a welding gun.

A pedestal welding gun station is a fairly common robot cell element that incorporates a resistance welding gun in a position that makes it accessible to one or more industrial robots. The industrial robot is used to manipulate an assembly of sheet metal stampings for presentation to one or more pedestal-mounted welding guns, or other equipment in the robot cell.

In the resistance spot welding process, a pair of copper alloy electrodes squeeze together on overlapping metal sheet(s) at the location a resistance spot weld is desired. The face geometry of the spot welding electrodes is selected based on the workpiece material(s) and thickness, desired weld size, and other process factors such as heat balance, weld appearance, and the presence of coatings, adhesives, or sealants. After sufficient force has been applied to bring the surfaces to be welded into intimate contact, a precisely controlled electrical current is passed between the copper alloy electrodes so it causes heating in the workpiece to achieve the weld.

The face of electrodes are subjected to significant localized heating, mechanical forces, and material interactions. The result is chemical and physical changes that affect the electrical conductivity of the welding electrodes and the concentration of heating and force. Some compensation is usually provided by automatic adjustment of resistance welding control parameters. At some point, it becomes necessary to either refurbish the electrode face or replace the electrode.

Most prior art involves tools that are manually operated or accessed by a robot mounted resistance welding gun. Pedestal-mounted welding guns are sometimes fitted with tip dressers that swing into a maintenance position, which is in the path of the closing welding electrodes. When the robot performs material handling, the full range of electrode maintenance tools does not appear to have been previously considered.

SUMMARY

In one exemplary embodiment, a welding station includes a welding gun that includes first and second electrode caps. The welding gun is movable between a working position and a maintenance position. The working position corresponds to a welding operation on at least one workpiece. A maintenance tool assembly is configured to cooperate with the first and second caps in the maintenance position. The maintenance tool assembly includes a cap extractor, cap dispensers and a cap dresser. The cap extractor is configured to remove the first and second caps from the welding gun. The cap dispensers are configured to provide new caps to the welding gun for installation. The cap dresser is configured to shape the electrode cap faces. The maintenance tool assembly includes a lift actuator. A translate actuator is respectively configured to move the maintenance tool assembly in the lift and translate directions with respect to the welding gun.

In a further embodiment of any of the above, the maintenance tool assembly includes a plate that supports the cap extractor, the cap dispensers and the cap dresser. A platform is mounted to a pedestal that pivotally supports the weld gun for rotation between the working and maintenance positions. The translate actuator is configured to slide the plate relative to the pedestal along slide ways.

In a further embodiment of any of the above, the lift actuator is arranged between the plate and platform and is configured to lift the plate relative to the platform.

In a further embodiment of any of the above, the cap extractor includes a housing and a pair of springs. First and second arms are arranged between the springs. Each of the first and second arms have teeth configured to engage a welding cap. The first and second arms are configured to move relative to the housing in first and second directions transverse to one another by deflecting the springs.

In a further embodiment of any of the above, the cap dispensers include a sleeve that slidably receives a drawer configured to house a column of weld caps. A spring cooperates with a slide block arranged in the drawer. The spring urges the slide block toward an aperture in the drawer that is configured to receive a welding gun electrode adapter.

In one exemplary embodiment, a method of operating a welding station includes a welding gun that is pivoted from a welding position to a maintenance position. A worn welding cap is extracted from the welding gun in the maintenance position. A new welding cap is installed on the welding gun in the maintenance position. A worn or new welding cap is dressed in the maintenance position.

In a further embodiment of any of the above, the method includes the step of translating a maintenance tool assembly between cap extracting, cap dispensing, and cap dressing positions, which respectively provide the extracting, installing and dressing steps.

In a further embodiment of any of the above, the maintenance tool assembly is supported on a plate and includes the step of lifting or lowering the maintenance tool assembly during at least one of the extracting, installing and dressing steps.

In a further embodiment of any of the above, the method includes the step of sensing the presence of the new welding cap subsequent to performing the installing step.

In a further embodiment of any of the above, the method includes the step of sensing the absence of the old welding cap subsequent to performing the extracting step.

In a further embodiment of any of the above, the method includes the step of sensing the newly installed welding cap presence subsequent to returning the welding gun to the welding position.

In one exemplary embodiment, a cap extractor for a welding gun includes a housing, a pair of springs, and first and second arms arranged between the springs. Each of the first and second arms have teeth configured to engage a welding cap. The first and second arms are configured to move relative to the housing in first and second directions transverse to one another by deflecting the springs.

In a further embodiment of any of the above, the first and second arms are mounted to spaced apart disks. The first and second arms are pivotally connected to one another by a spacer pin that rotationally affixes the disks to one another.

In a further embodiment of any of the above, the springs are wave springs. Each wave spring is received in a recess of one of the disks. A collar is arranged between each disk and the housing to locate a respective wave spring relative to the housing.

In a further embodiment of any of the above, an actuator is pivotally attached to the housing. The actuator is operatively connected to the first arm to rotate the first and second arms along with the disks. The actuator is configured to articulate relative to the housing during rotation of the first arm in the housing.

In a further embodiment of any of the above, a biasing spring is interconnected to the first and second arms to urge the first and second arms toward one another.

In one exemplary embodiment, a method of removing a cap from a welding gun includes a welding cap having a centerline received between teeth of first and second arms. The arms float along the centerline and are lateral relative to the centerline during the receiving step to permit alignment between the teeth and the welding cap. The welding cap is twisted from a welding gun.

In a further embodiment of any of the above, the method includes the step of normally biasing the first and second arms toward one another. The receiving step separates the first and second arms.

In a further embodiment of any of the above, one of the first and second arms abuts a stop to precede the receiving step. One of the first and second arms is spaced from the stop during the twisting step.

In a further embodiment of any of the above, the first and second arms are supported between disks. The first and second arms include the step of the disks supported by springs. The floating step includes deflecting at least one of the springs.

In a further embodiment of any of the above, an actuator is pivotally mounted to a housing which contains the first and second arms. The twisting step includes articulating the actuator relative to the housing and rotating the first and second arms relative to the welding gun.

In one exemplary embodiment, a cap dispenser for a welding gun includes a sleeve that slidably receives a drawer configured to house a column of weld caps. A spring cooperates with a slide block arranged in the drawer. The spring urges the slide block toward an aperture in the drawer that is configured to receive a welding gun electrode.

In a further embodiment of any of the above, the spring is a clock spring wound about a drum. The drum is mounted to a roller pin secured to a spring housing arranged on the sleeve. One end of the clock spring is connected to the slide block.

In a further embodiment of any of the above, the drawer includes a ramp that selectively cooperates with a movable pin mounted to the sleeve. The pin is configured to maintain the drawer within the sleeve and resist the clock spring.

In a further embodiment of any of the above, the spring urges the drawer to an extended position relative to the sleeve.

In a further embodiment of any of the above, the cap dispenser includes a sensor mounted relative to the drawer and configured to detect a weld cap orientation relative to the aperture.

In one exemplary embodiment, the method of dispensing caps for a welding gun includes a weld cap which is biased to an aperture in a dispenser. A weld gun electrode adapter is inserted through the aperture to engage the weld cap.

In a further embodiment of any of the above, the biasing step includes the weld cap which is urged toward the aperture with a slide block connected to a spring.

In a further embodiment of any of the above, the cap dispenser includes the step of providing a column of weld caps within a drawer that is slidably received in a sleeve. The slide block is arranged in the drawer.

In a further embodiment of any of the above, the cap dispenser includes removably retaining the drawer relative to the sleeve. The drawer is released relative to the sleeve to load more weld caps.

In a further embodiment of any of the above, the cap dispenser includes sensing an orientation of the weld cap that is sensed within the dispenser. The cap dispenser provides a weld cap orientation signal to a controller for monitoring.

BRIEF DESCRIPTION OF THE DRAWINGS

The disclosure can be further understood by reference to the following detailed description when considered in connection with the accompanying drawings wherein.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible. Like reference numbers and designations in the various drawings indicate like elements.

DETAILED DESCRIPTION

Figure 1:
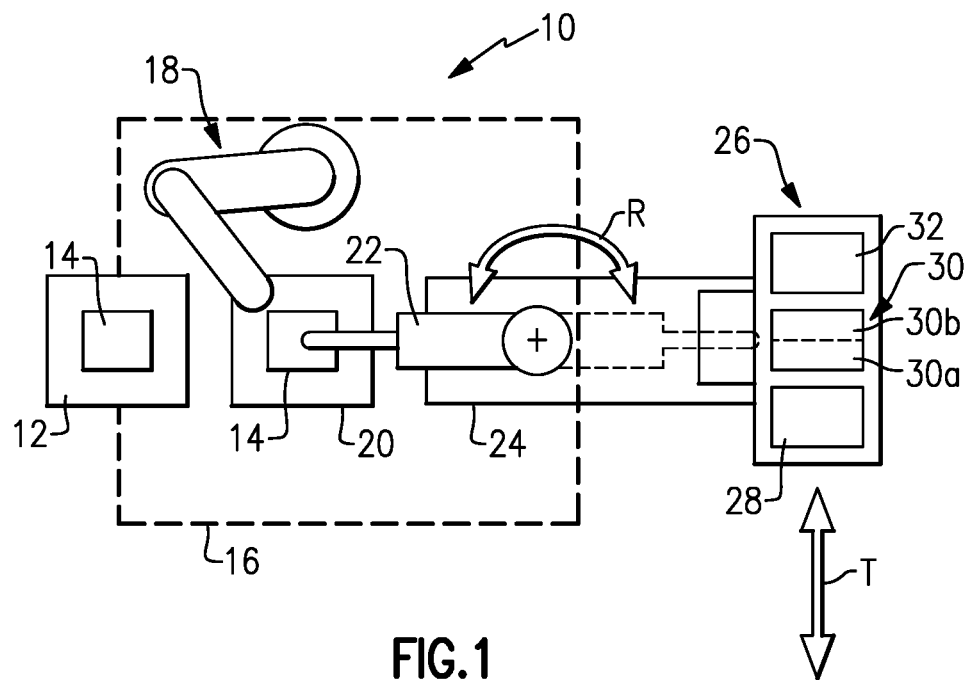
FIG. 1 schematically illustrates a welding station.

A welding station 10 is schematically illustrated in FIG. 1. One example station 10 includes a load fixture 12 that establishes the position of workpieces 14 at the entrance to the welding station 10. The welding station 10 includes a robot 18, which may be enclosed by a perimeter fence 16 for safety.

Workpiece 14 may be placed into the load fixture 12 by an operator or automation. The robot 18 may retrieve workpiece 14 from the load fixture 12 using robot end of arm tooling 20 that holds the workpiece in the desired orientation and configuration. A welding gun 22 is mounted to a base 24 and spot welds the workpiece 14, for example.

The welding gun station is commonly employed within robot cells for both spot and projection welding. Such robot cells employ one or more material handling robots to manipulate the workpiece(s) instead of the heavy resistance welding gun. This enables the use of smaller, more agile, and less expensive robots to automate the process. This robot cell configuration is also useful when the process involves multiple resistance welding guns that may be different sizes, configurations, or orientations. Or it may enable the robot to manipulate a workpiece between a number of stations employing different processes necessary to complete an assembly. Processes could for example include metal working, coating application, arc welding, fastener welding, assembly, and inspection.

The fence 16 can provide isolation between the robot cell and the electrode maintenance station including a maintenance tool assembly 26 for removing, installing and/or dressing the welding gun electrodes. This barrier would prevent the process on one side from affecting the other. It would therefore permit operations such as manual electrode maintenance or replacing the electrode dispensers to occur without interrupting the robot cycle.

A maintenance tool assembly 26 is mounted to the base 24. Periodically, the welding gun 22 may be pivoted in a rotational path R to bring the welding "electrodes", "tips" or "caps" of the welding gun 24 to the maintenance tool assembly 26 for replacement and/or dressing. While it is possible in alternative configurations to pivot the welding gun to position the electrodes for extraction or replacement, the disclosed configuration illustrated employs a simple longitudinal translation T to move the tools. This improves the repeatability, control, and sensing of the welding gun pivot operation. It keeps the welding gun stationary during the maintenance operation so there is little chance of accidental collisions or unintended motion while in the electrode maintenance position.

Figure 3:
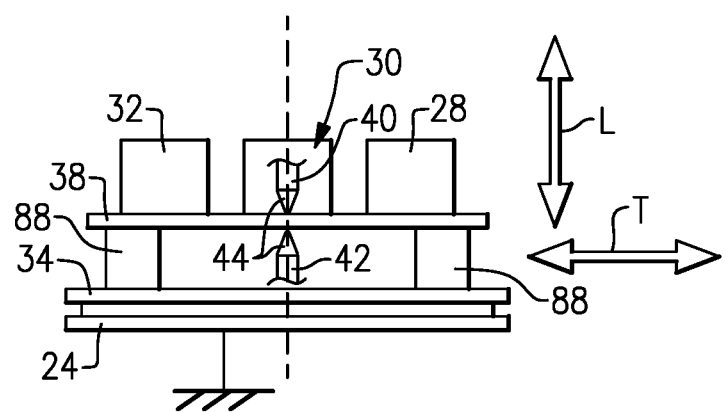
FIG. 3 schematically illustrates the maintenance tool assembly, which includes a cap extractor, a cap dresser, and cap dispensers.
Figure 2:
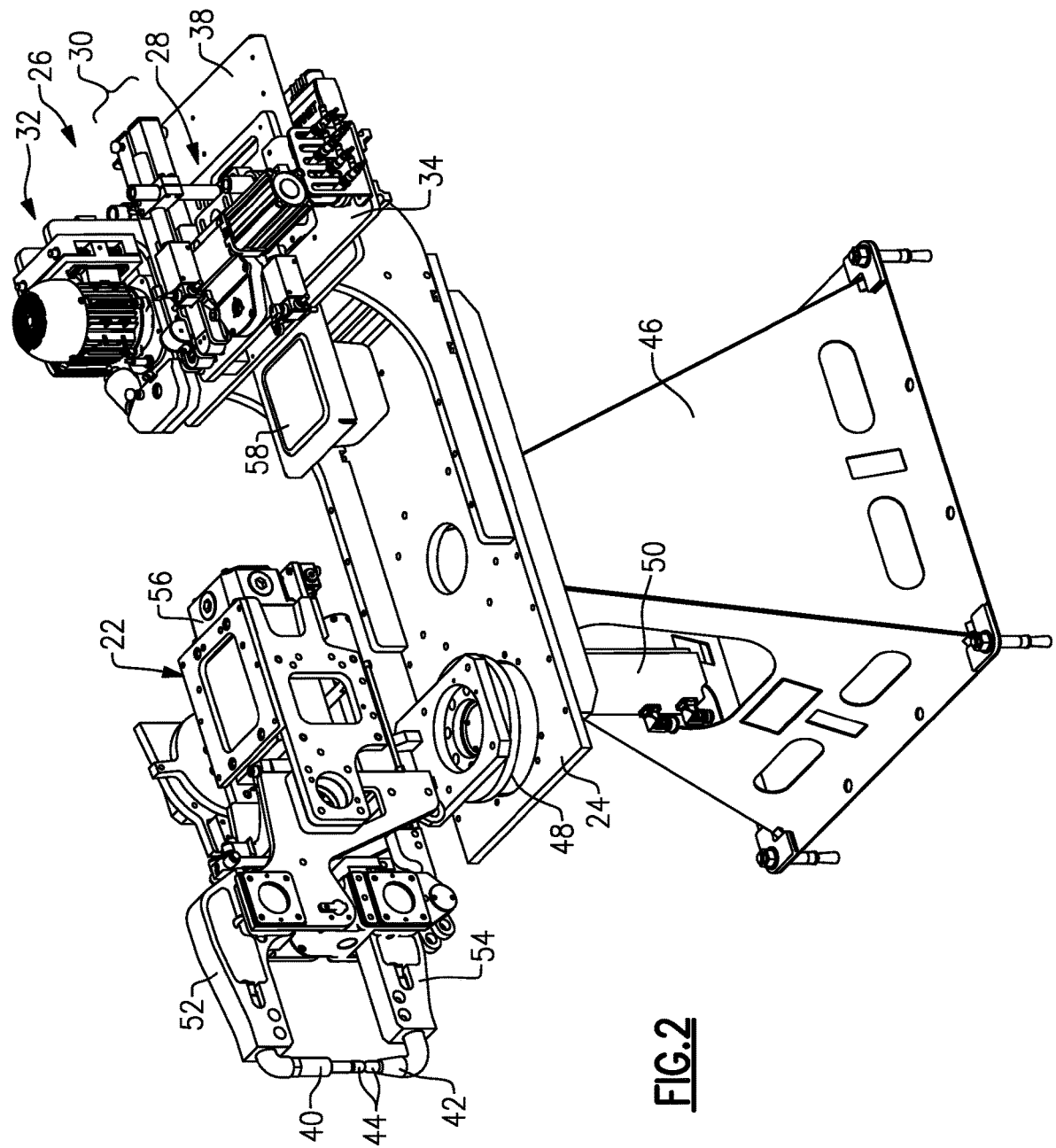
FIG. 2 depicts a welding gun and maintenance tool assembly integrated with one another on a pedestal.

Referring to FIGS. 1-3, the maintenance tool assembly 26 includes a cap extractor 28 and cap dispenser 30 including first and second cap dispensers 30A, 30B. A cap dresser 32 is provided at an end of the maintenance tool assembly 26 opposite the cap extractor 28 such that the cap dispenser 30 is arranged therebetween. The described resistance welding gun is for resistance spot welding but aspects of the configuration could be applied to projection welding equipment used to affix components such as fasteners or spacers.

Generally, a typical sequence would be to present the electrode caps to the tip dressing station on a regular basis. The frequency depends on the welding conditions but may be for example every 10, 25 or 100 welds. At that time the tip dresser would use cutters or forming tools to clean or restore the profile of the electrode cap tip so welding consistency can be maintained. After a number of these tip dressing cycles have been performed, it is necessary to replace the electrode cap with a new one. The replacement frequency may relate to the number of tip dressing cycles, a physical attribute such as electrode cap length, a welding performance indicator such as excessive or insufficient welding current, or feedback of weld discontinuities.

A conventional dressing station is included for periodic light cleaning and shaping of the electrode face(s). When dressing of the electrode is no longer appropriate, an electrode extractor and electrode dispenser can be employed to replace the electrode(s).

The resistance spot welding gun station is configured to facilitate the required electrode maintenance so there is minimal impact on production throughput. Electrode maintenance is frequently performed during the time the industrial robot is executing material handling (i.e., retrieving workpieces or delivering the completed weldment to the unload station) or another function such as in-line inspection. The described robotic welding cell module permits maintenance to be performed entirely manually, or with automation. The electrode maintenance tools are modular in nature so the system can be reconfigured depending on the business priorities and financial analysis.

The disclosed resistance welding gun is mounted on a pivot unit assembly that enables the welding electrodes to be presented to a location away from the production area. The pivot is operated by a pneumatic cylinder that rotates the welding gun between hard position stops. The pivot could also be operated by a servo drive or other mechanical or electrical system that facilitates accurate positioning of the welding electrodes. The resistance welding electrodes can be serviced when the robot is being utilized to perform the workpiece manipulation. This reduces the possibility the robot cell throughput will be affected by the electrode maintenance operation.

The number and position of maintenance tools can be established to suit the anticipated electrode maintenance frequency, production rate, or resistance welding cell configuration. The station could include no maintenance tools to start, where the pivoting mechanism is used alone to present the welding electrodes outside of the robot cell for manual maintenance or replacement. An automatic electrode cap dressing tool could be added for regular lightly cleaning and profiling of the welding face. Additional tooling stations could be added to provide the capability to reshape the welding face or to remove and replace a worn out electrode.

The maintenance tools are outside of the production space, which can improve access to the electrode maintenance tools for servicing (e.g., emptying chips from the dresser or reloading cap dispenser), put the electrode maintenance tools in a location that is safer or more accessible to the personnel that are necessary to maintain them, permit a configuration that allows servicing of the electrode maintenance tools while the welding equipment is performing a production sequence, and ensure the production cell is not contaminated with errant machining chips, coolant, or electrode caps.

Referring to FIG. 2, the welding gun 22 includes first and second arms 52, 54 carrying first and second electrode adapters 40, 42, respectively. An electrode cap 44 is mounted on each of the first and second electrode adapters 40, 42. The caps 44 may be identical or could have different sizes and shapes to suit the welding conditions. The base 24 is supported by a pedestal 46 arranged within the work area. The welding gun 22 is supported with respect to the base 24 by a pivot 48 that is rotated between first and second positions by a pivot cylinder 50. The first and second positions may be 180° from one another. The welding gun is shown in the working position in FIG. 2. The spot welding gun is moved clear of the welding area by a simple and reliable pivoting motion, that also positions the welding electrodes within reach of the integrated electrode maintenance tools. At least part of the time required for the off-line electrode maintenance process can be conducted while the robot continues to perform a material handling function.

Referring to FIGS. 2 and 3, the cap extractor 28, cap dispenser 30, and cap dresser 32 are mounted to a plate 38 that is carried by a platform 34. The plate 38 is slideably mounted to the base 24, which may include numerous members secured to one another. This translation stage puts the desired maintenance tool in the required position to service the electrode(s), which may include lifting the tool between a lowered and raised position to service the lower and upper electrode respectively. The maintenance tool assembly 26 translates along a longitudinal direction T (FIG. 3) between numerous positions to place the components of the maintenance tool assembly 26 in the desired position with respect to the caps 44. The maintenance tool assembly 26 may also move in a vertical direction L (FIG. 3) to lift and lower the maintenance tool assembly with respect to the caps 44 during maintenance. Because one electrode extractor can be used to remove either electrode cap, the translation stage incorporates the vertical lift so either the upper or lower electrode cap can be aligned with the electrode extractor. A bin 58 collects the used, extracted caps 44.

Figure 4A:
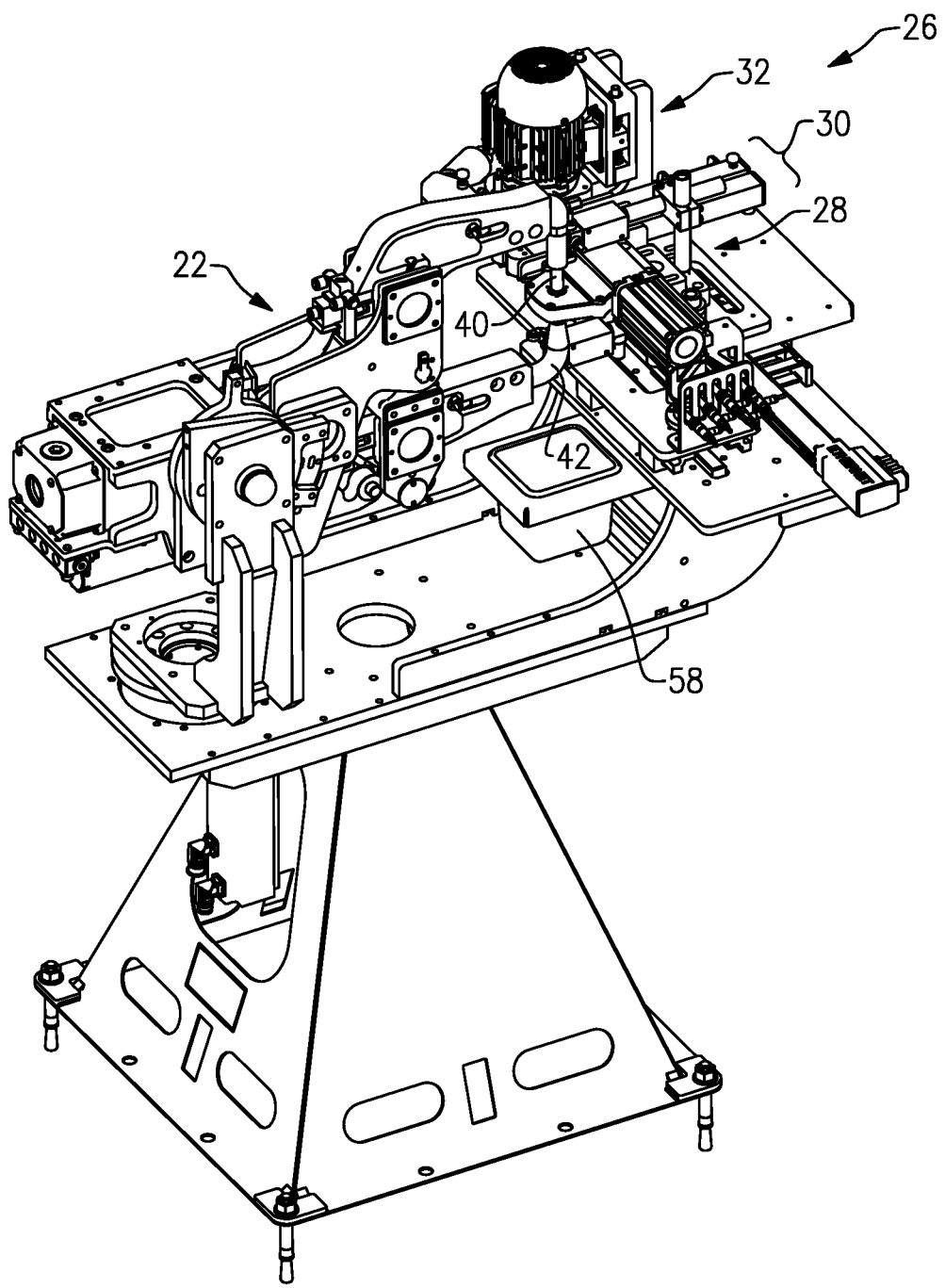
FIGS. 4A-4D illustrate the maintenance tool assembly in cap extracting, first and second cap dispensing, and cap dressing positions, respectively.

FIGS. 4A-4D illustrate various positions of the maintenance tool assembly 26 with respect to the welding gun. Either or both of the first and second arms 52, 54 of the welding gun 52 may open and close with respect to one another. In one example, one of the arms is fixed and the other arm articulates to open and close about the workpiece during welding operations. In another example, the first and second arms may both open and close about the workpiece. The maintenance tool assembly 26 lifts or lowers the maintenance tools with respect to the cap 44 and its relative position on the first and second arms 52, 54. In FIG. 4A, one of the caps 44 is inserted into the cap extractor 28. The cap 44 is rotated with respect to its electrode which breaks the cap 44 free from the welding gun. With the cap extractor 28 disengaged from the cap 44 (by raising or lowering the maintenance tool assembly 26), the cap 44 may be released by the cap extractor 28, dropping the cap into the bin 58.

Figure 4B:
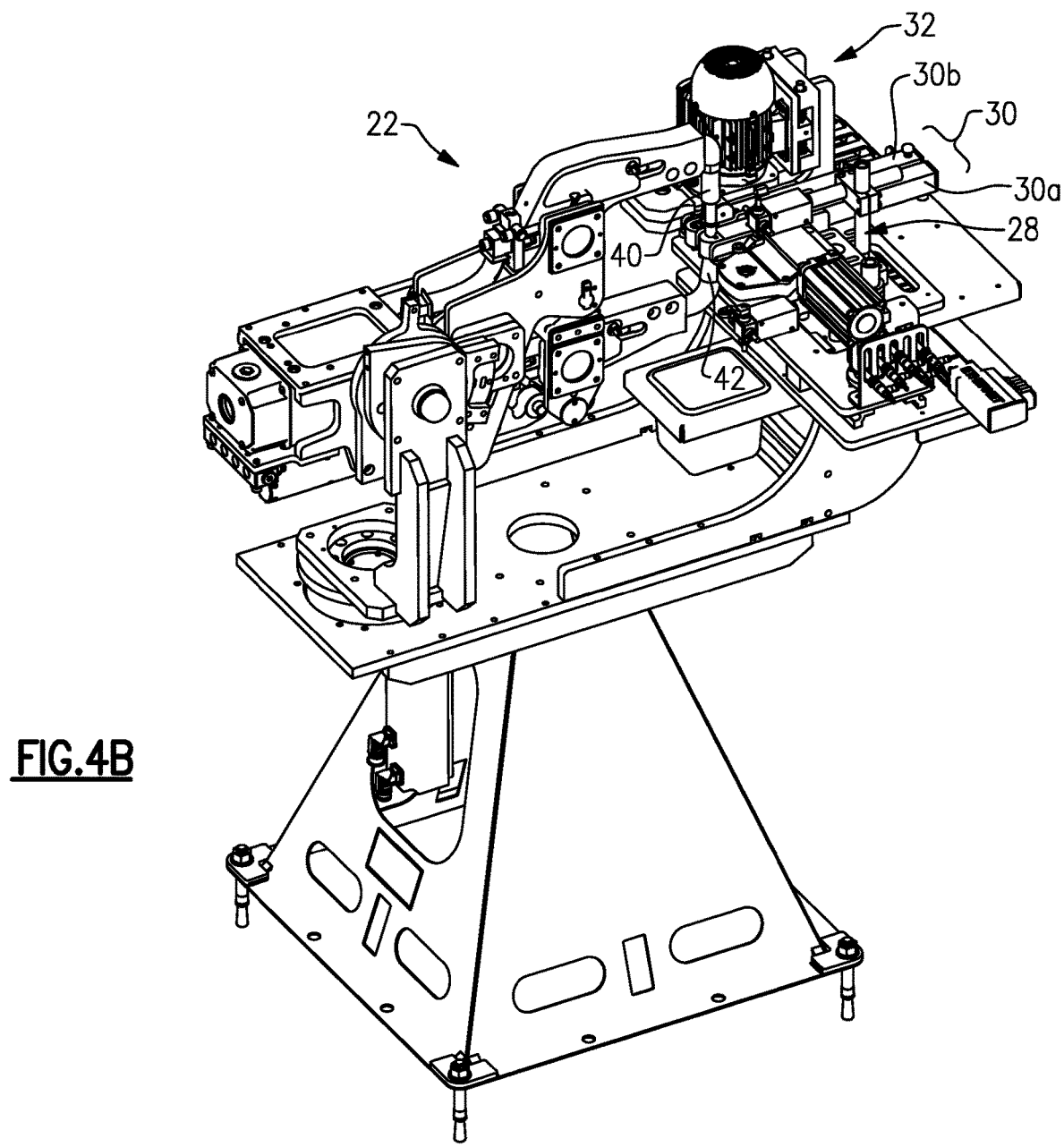
Figure 4C:
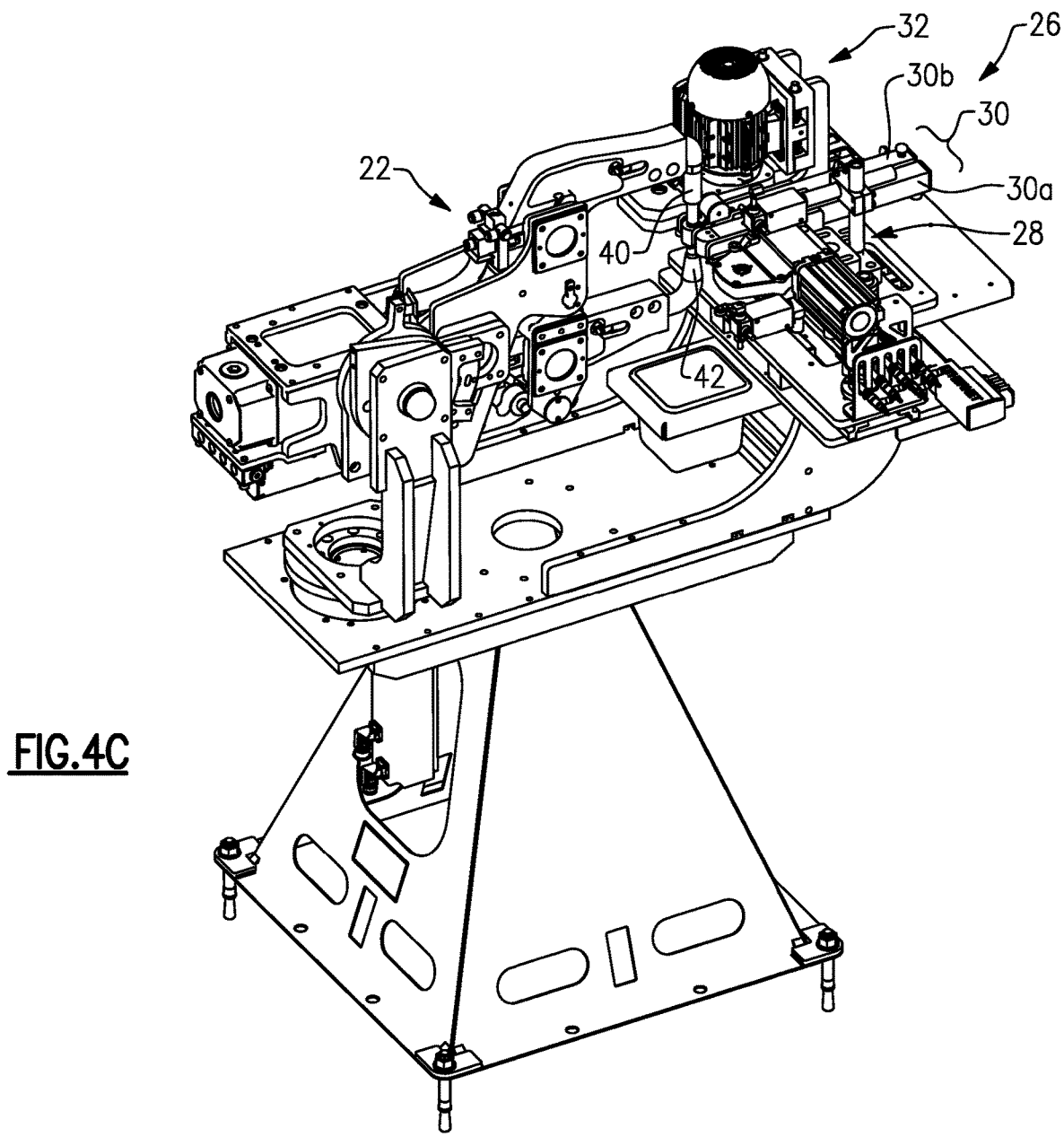

Referring to FIGS. 4B and 4C, the electrode adapter 40, 42 without its cap 44 may be inserted into one of the cap dispensers 30A, 30B of the cap dispenser 30. The first and second electrode adapters 40, 42 are closed about the new cap to seat the cap firmly on the electrode in an interference fit. Both the caps 44 can be removed from the first and second electrode adapters 40, 42 by the cap extractor 28 before installing new caps using the cap dispensers 30A, 30B. Alternatively, the cap may be removed from one electrode adapter 40, 42 by the cap extractor and a cap installed onto it before repeating the process for the other electrode.

Figure 4D:
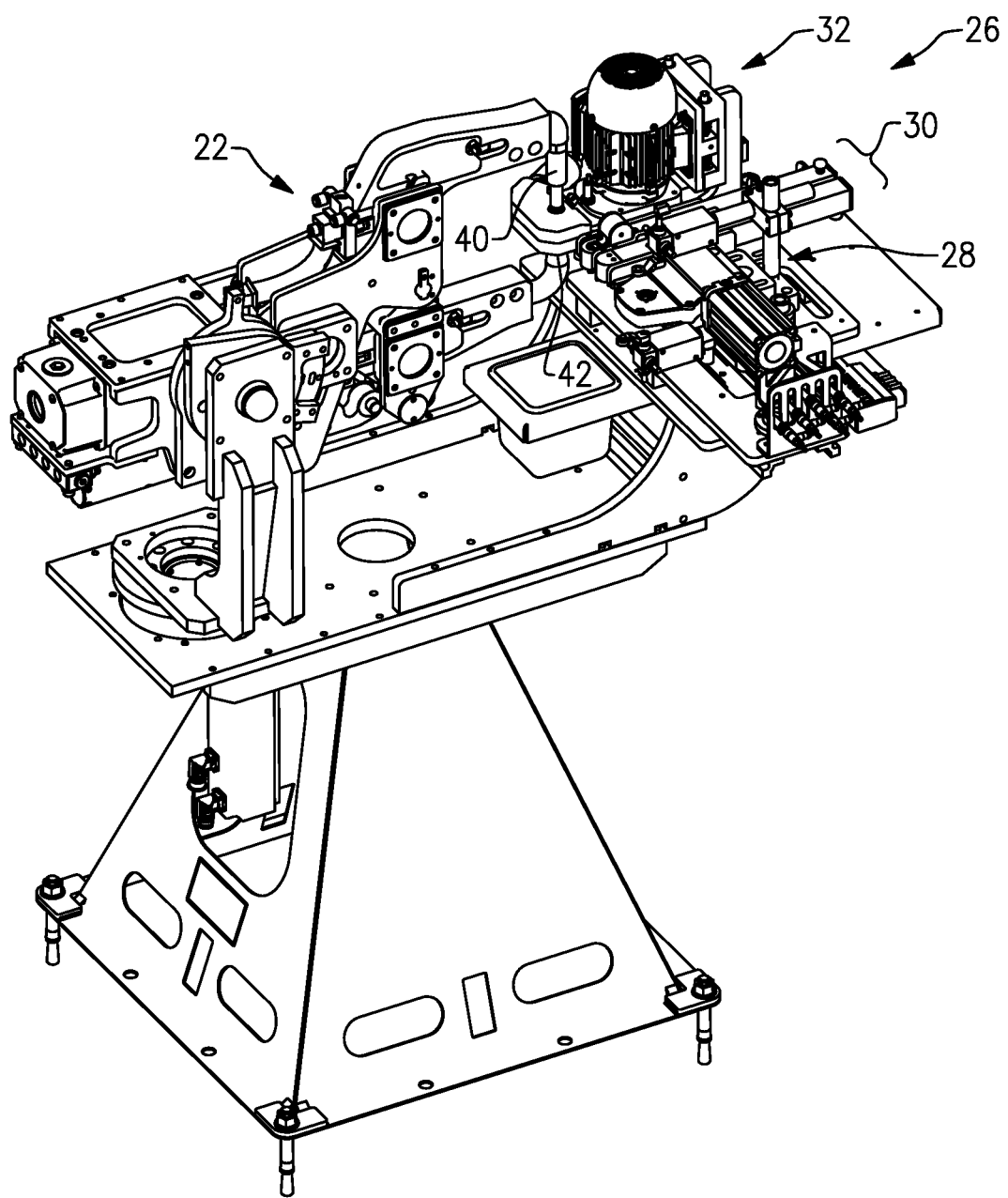

The new caps may be dressed by the cap dresser 32, as shown in FIG. 4D. In the example, the caps are dressed simultaneously by closing the first and second electrodes about an aperture of the cap dresser 32. The cap dresser 32 may also be used to periodically dress used caps before the need to replace the caps 44.

Figure 5:
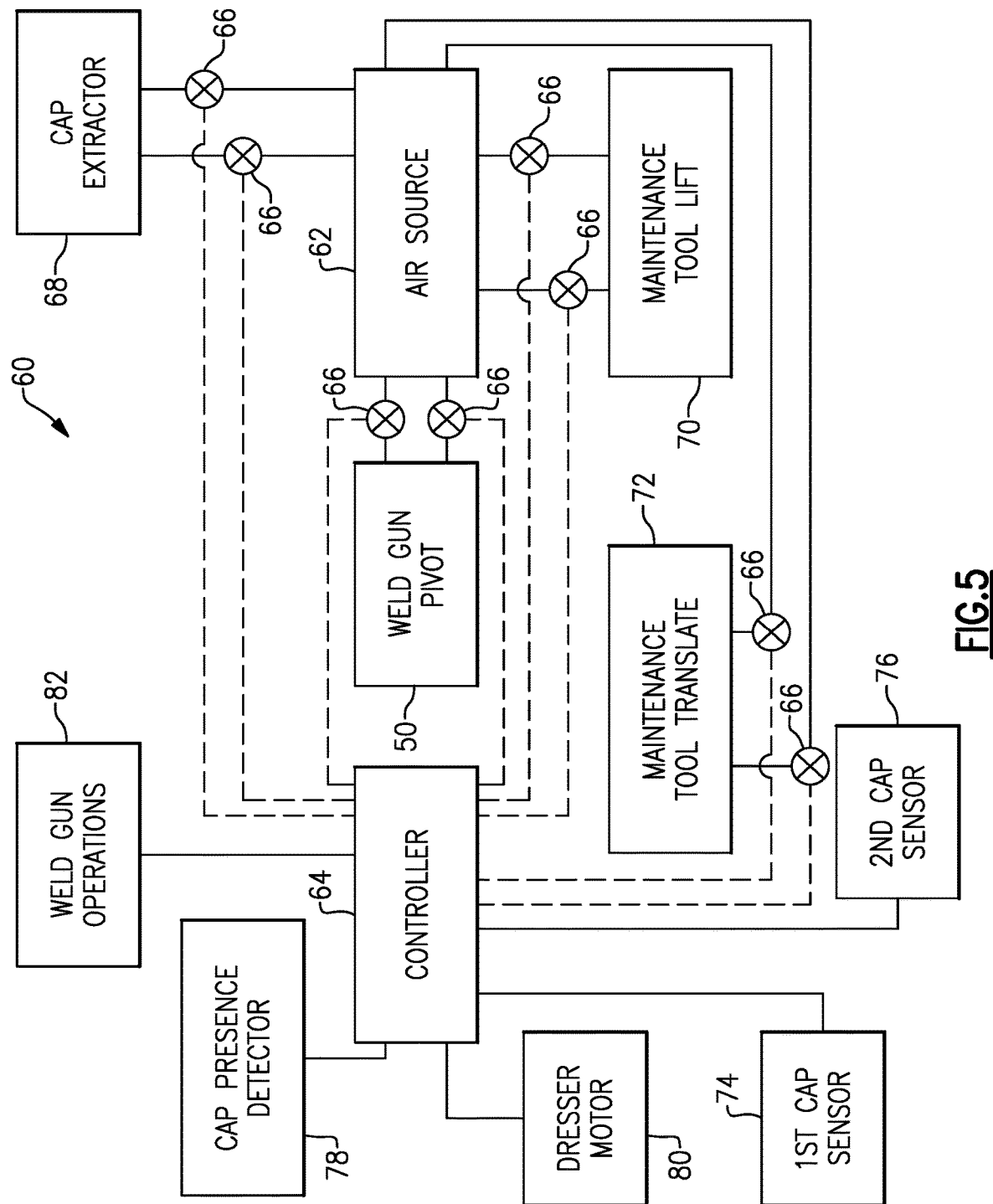
FIG. 5 is a schematic depicting a control system for the welding station including welding gun and maintenance tool assembly controls.

A control system 60 is schematically shown in FIG. 5. The system 60 includes an air source 62 that selectively supplies compressed air to various components via control valve 66 that are operated by a controller 64. The air source 62 supplies to a cap extractor cylinder 68 of the cap extractor 28, a maintenance tool assembly lift cylinder 70, and translate cylinder 72 of the maintenance tool assembly 26 and the welding gun pivot cylinder 50. Other types of actuators may be used instead of air cylinders, if desired.

Figure 6:
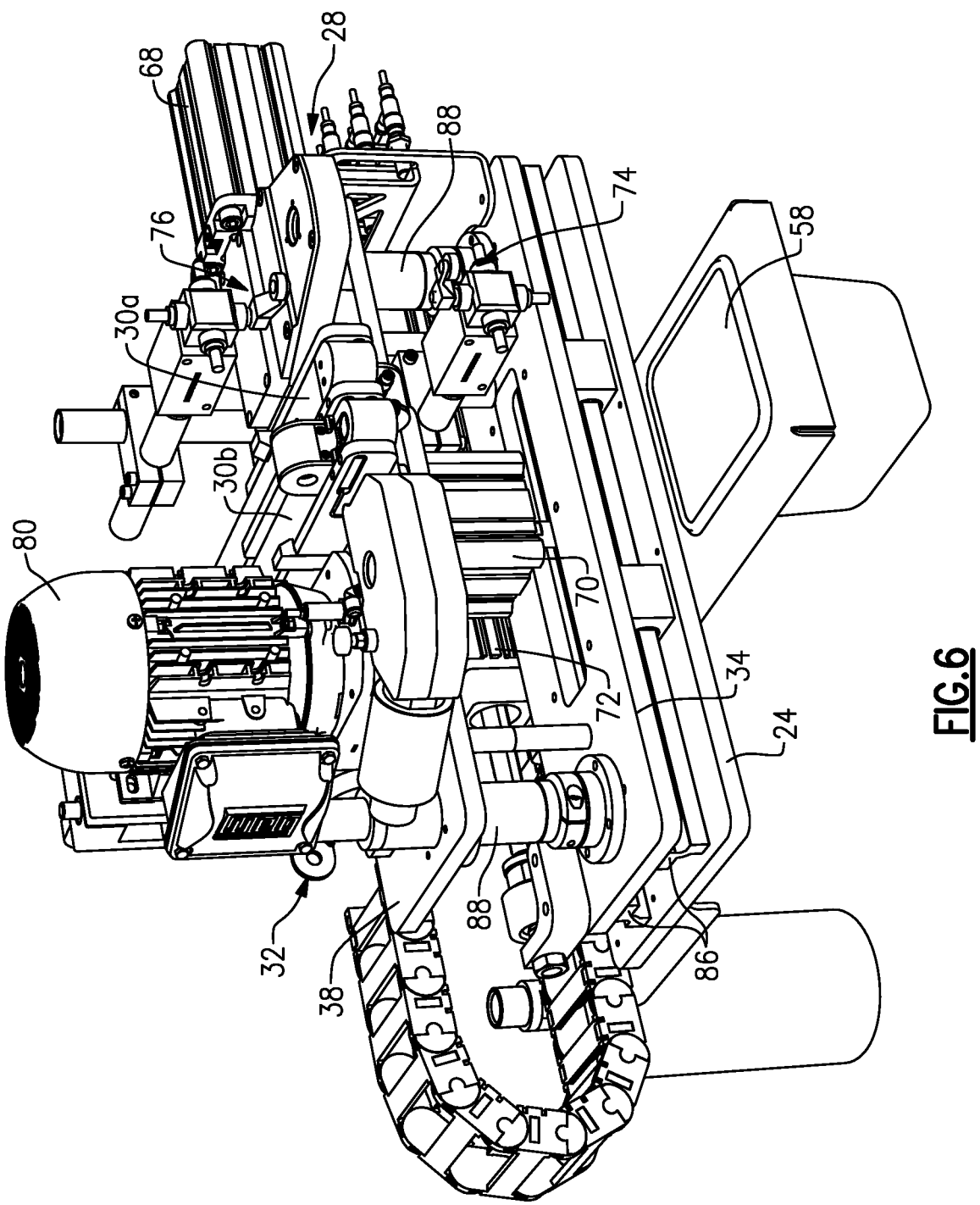
FIGS. 6-9 illustrate perspective, front, side, and cross-sectional views, respectively, wherein the cross-sectional view is taken along line 9-9 in FIG. 8.
Figure 7:
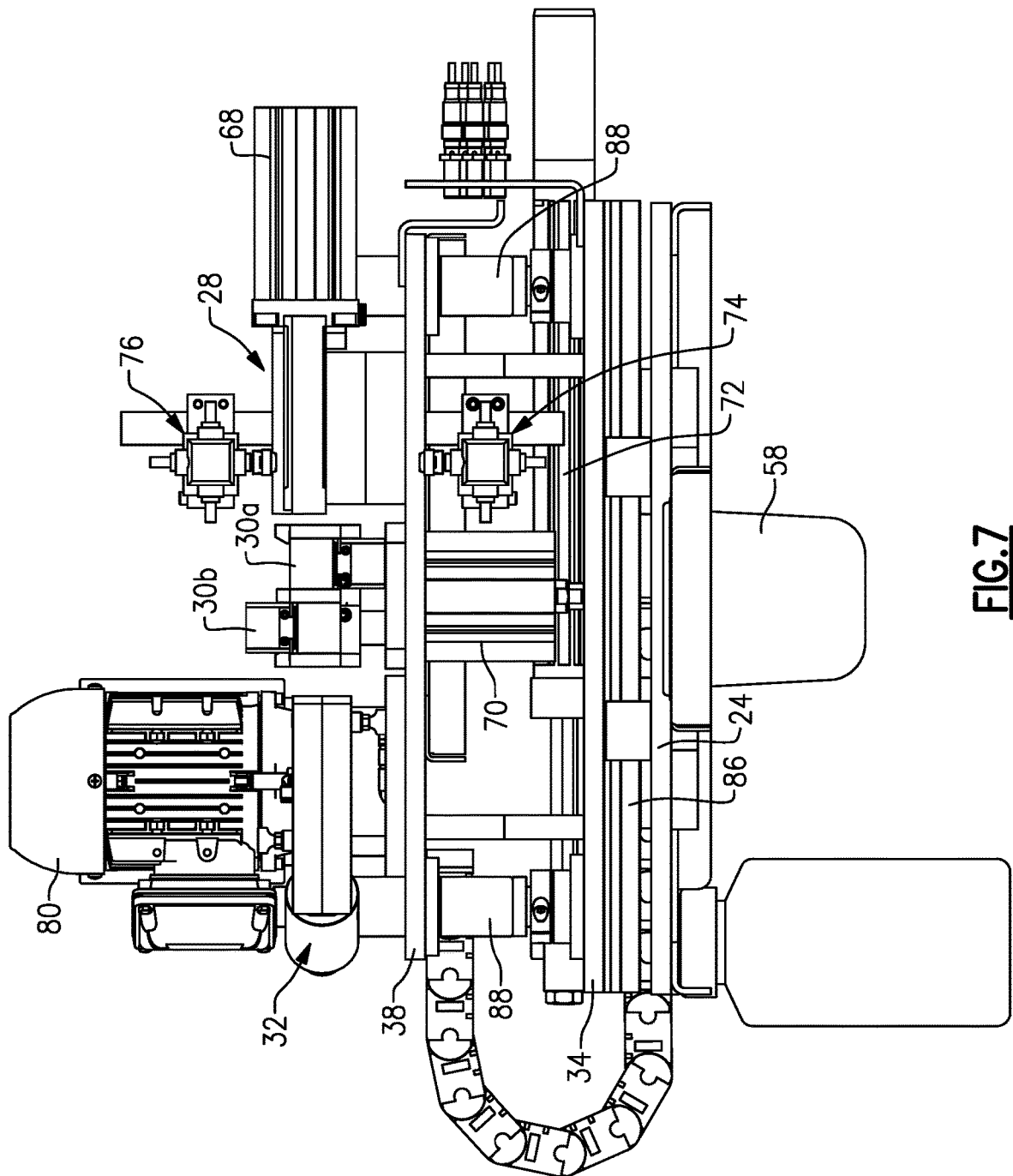
Figure 8:
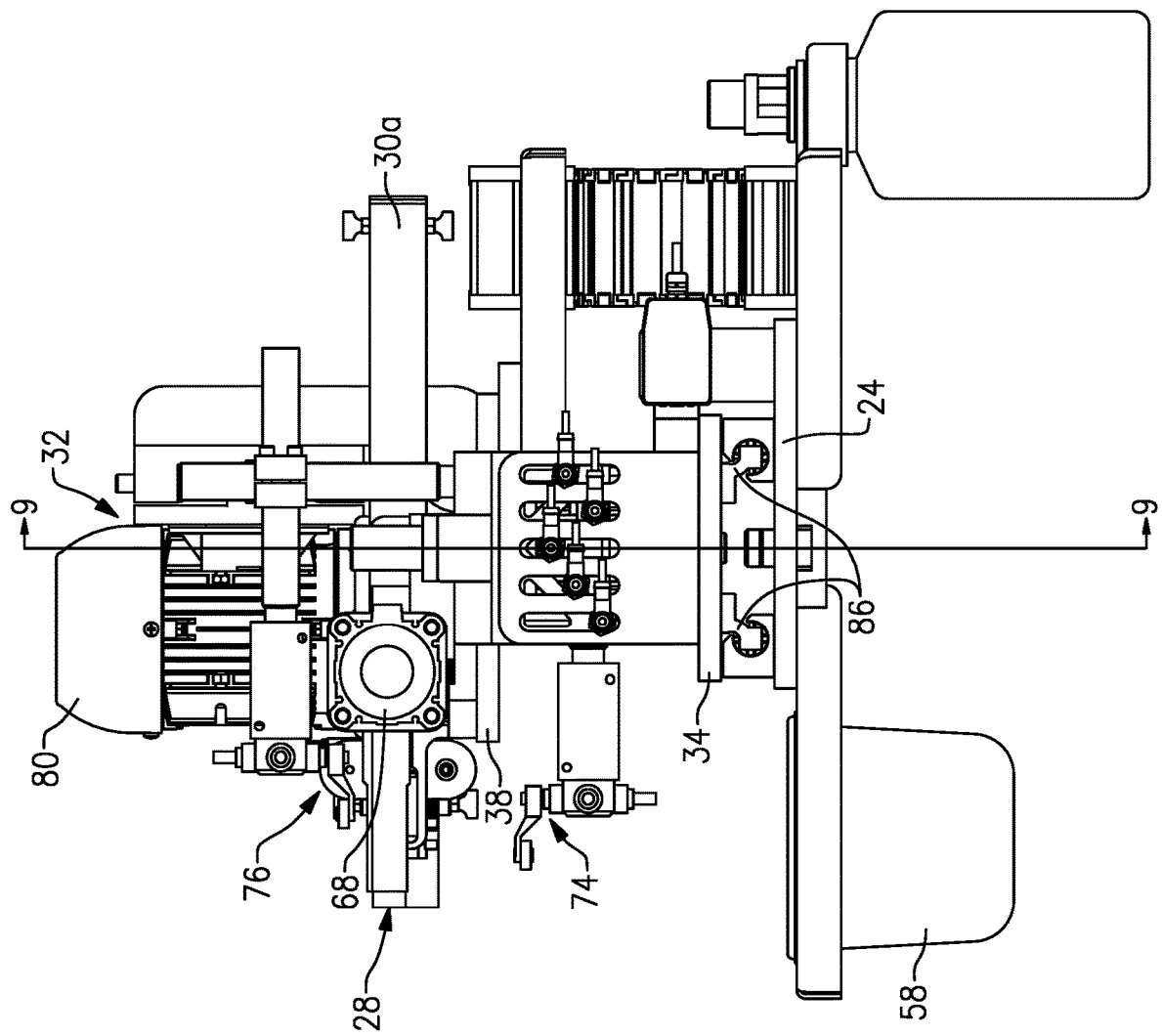
Figure 9:
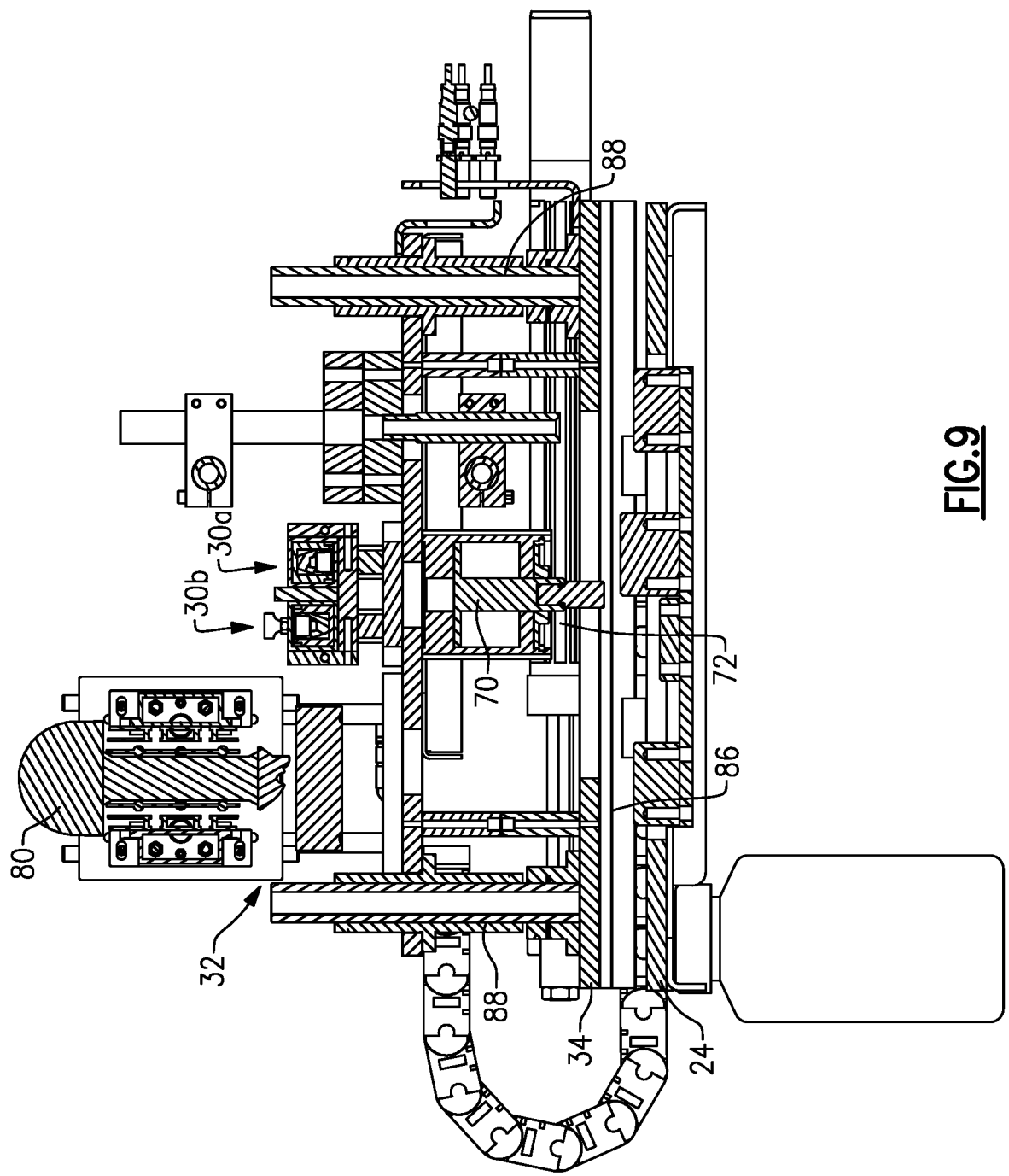
Figure 18:
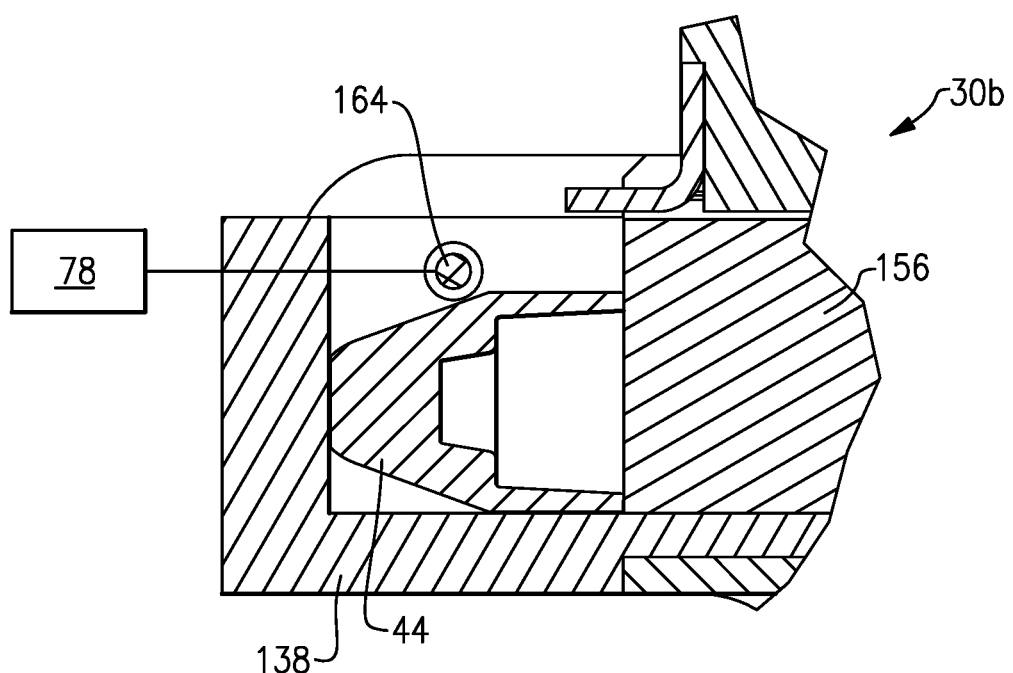
FIG. 18 is an enlarged cross-sectional view of a cap in an improperly loaded position within the cap dispenser, triggering a fault code.

The first and second cap sensors 74, 76 (also shown in FIGS. 6-8) may be used to detect the presence or absence of a cap 44 during the maintenance procedure. One or more cap presence detectors 78 may be used with the first and second cap dispensers 30A, 30B to detect an improper orientation and fault of a cap 44 within the cap dispenser 30 (FIG. 18).

The motor 80 of the cap dresser 32 is operated by the controller 64. Additionally, the controller 64 may also be used to control and monitor the welding gun 22 during various welding gun operations, as indicated in block 82, including tracking when the welding gun is in need of tip maintenance.

Referring to FIGS. 6-9, the platform 34 is slideably supportive with respect to the base 24 by a slide assembly 86. The translate cylinder 72 moves the platform 34 with respect to the base 24 and the welding gun 22 supported thereon between various discrete longitudinal positions (shown in FIGS. 4A-4D) to align the desired components of the maintenance tool assembly 26 with respect to the electrodes and/or caps.

The plate 38 is supported with respect to the platform 34 by guide posts 88. A lift cylinder 70 is arranged laterally between guide posts 88 and vertically between the platform 34 and plate 38. The lift cylinder 70 raises and lowers the maintenance tool components to their desired positions.

The first and second cap sensors 74, 76 may be used to detect the presence of a cap 44 subsequent to extraction by the cap extractor 28 and installation of a new cap by the first and second cap dispensers 30A, 30B. If a cap is absent when one should be installed or present when it should have been removed, a fault is indicated.

Figure 10:
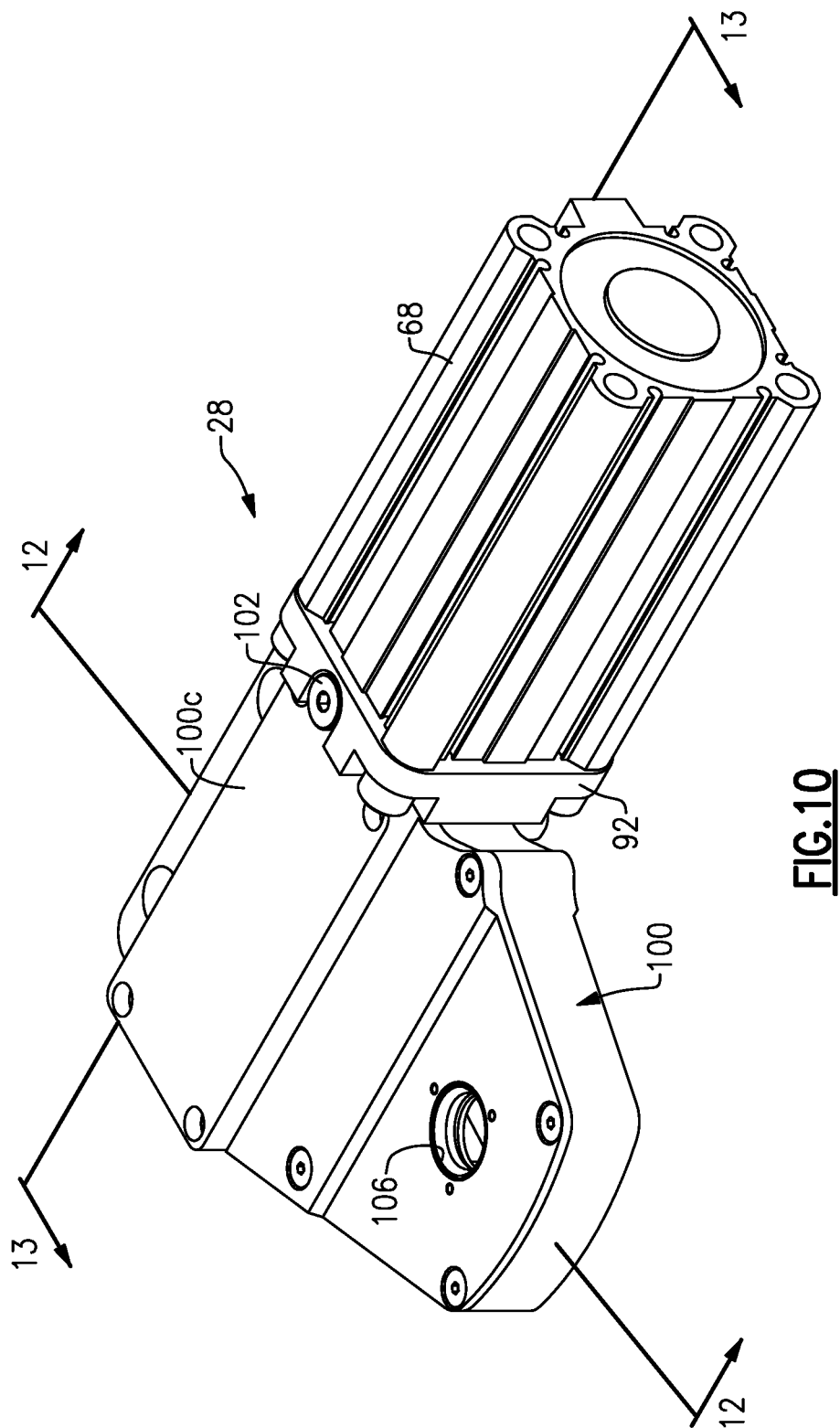
FIGS. 10-12 are perspective, exploded, and cross-sectional views, respectively, of the cap extractor, wherein the cross-sectional view is taken along line 12-12 of FIG. 10.
Figure 11:
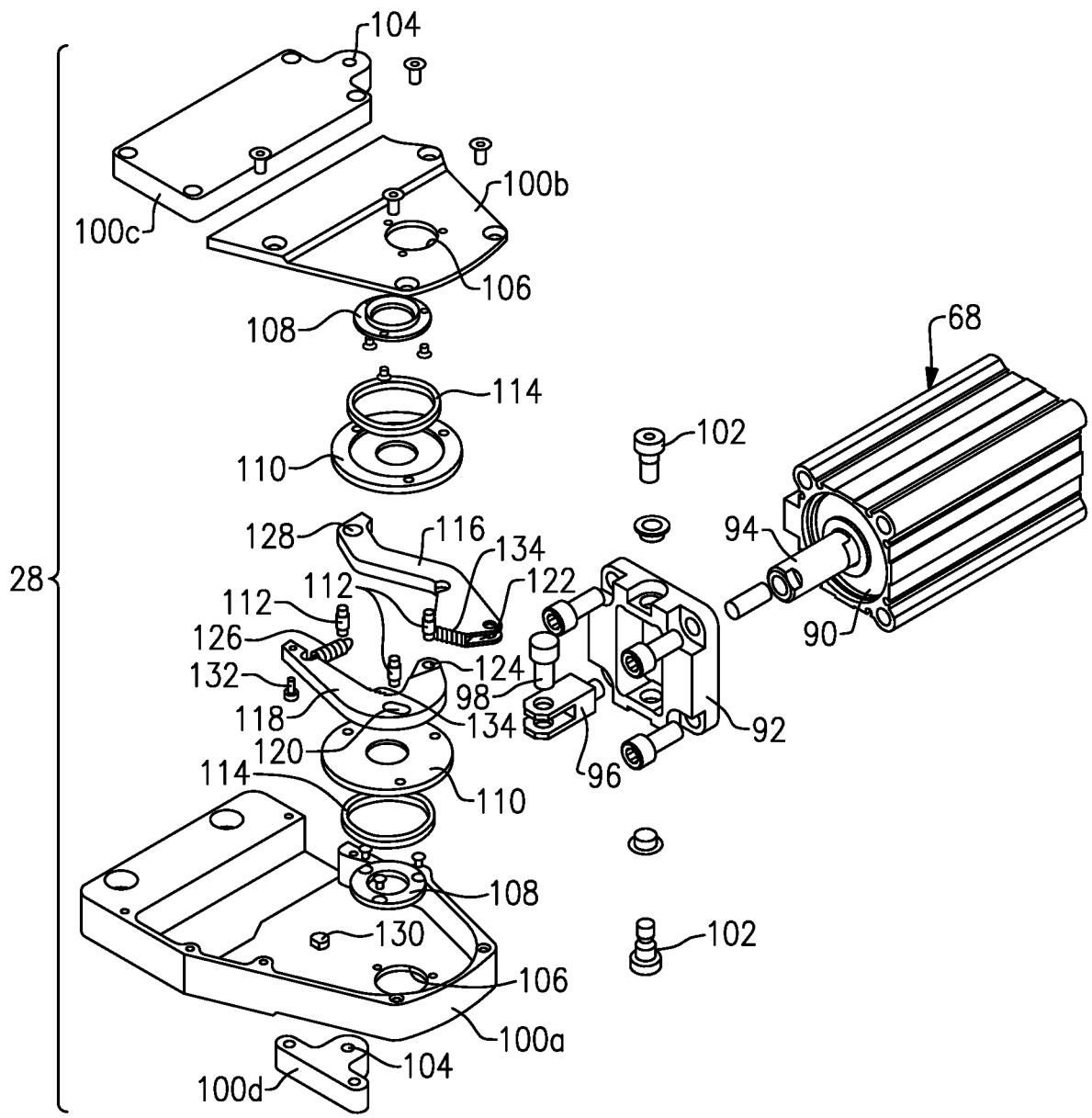
Figure 12:
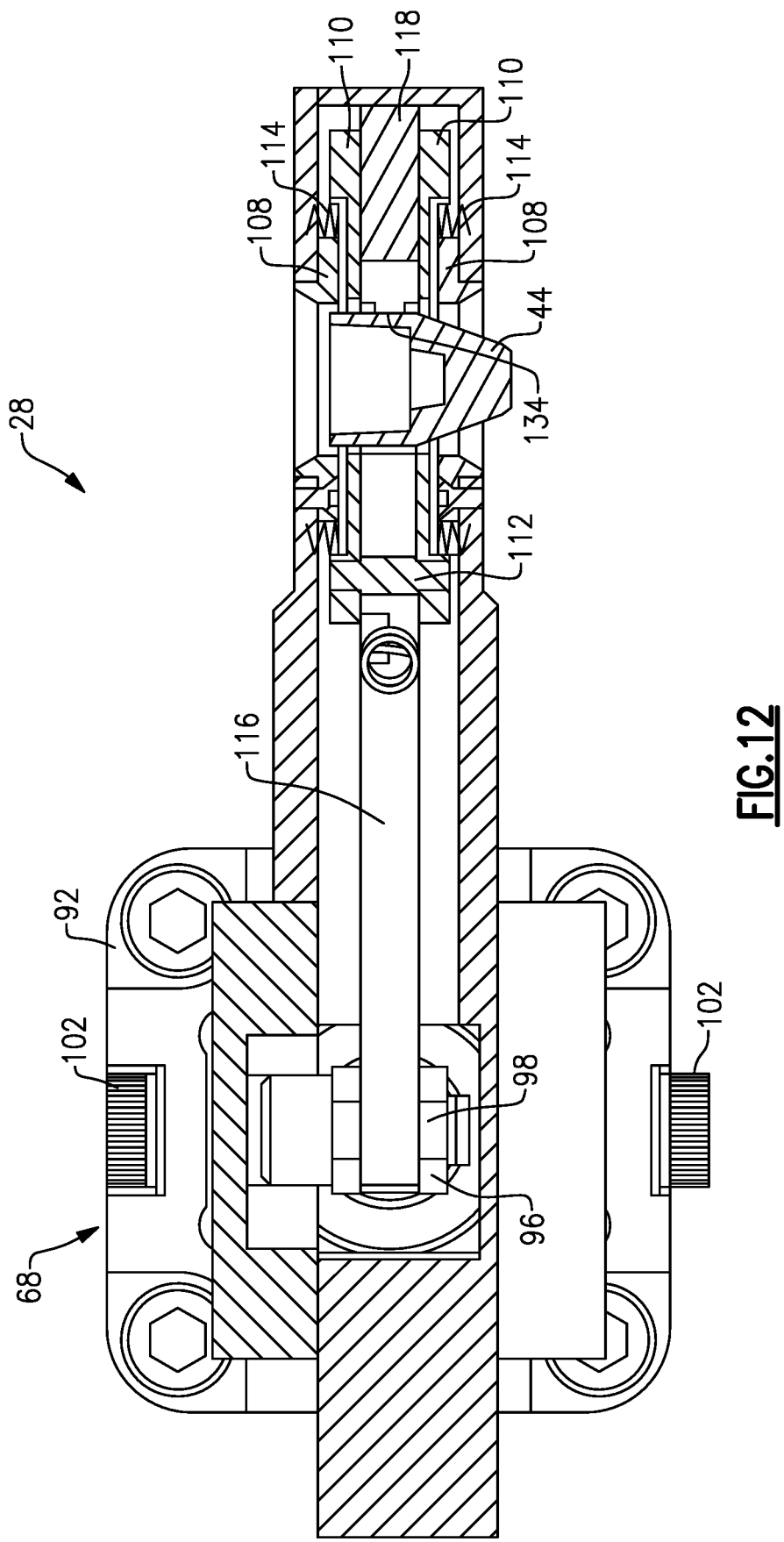

The cap extractor 28 is illustrated in more detail in FIGS. 10-12. The extractor cylinder 68 includes a cylinder body 90 housing a piston. The cylinder body is secured to a mounting plate 92. A rod 94 is connected to the piston within the cylinder body 90 and extends through the mounting plate 92 to a clevis 96.

The extractor cylinder 68 is mounted to a housing 100 by spaced apart pivot pins 102, which enables the extractor cylinder 68 to articulate with respect to the housing 100 during operation. The housing 100 may include multiple housing portions 100A-100D, collectively referred to as "the housing 100."

The housing 100 includes apertures 106 for receiving the end of an electrode adapter 40, 42 with its cap 44. Ends of collars 108 are arranged with the apertures 106, and wave springs 114 are arranged concentrically about each collar 108. A pair of spaced apart disks 110 have a recess that receives one side of the wave springs 114.

First and second arms 116, 118 are carried by the disks 110. The first arm 116 has a hole 128 that receives a pin 98 securing the clevis 96 to the first arm 116. The second arm 118 has an end 124 that is received in a channel 122 of the first arm. The first and second arms 116 and 118 are pivotably secured with respect to one another by a spacer 112 that spaces the disks 110 with respect to one another and ensures that they rotate together with respect to the housing 100. Another spacer 112 is received within a slot 120 in the second arm 118. In the example, three spacers 112 are circumferentially spaced with respect to one another and rotationally affix the disks 110 to one another.

A biasing spring 126 interconnects the first and second arms 116, 118 to urge them toward one another, in turn, bringing complementary teeth 134 toward one another to engage the cap 44. A stop 130 provided on the housing portion 100A limits the travel of the second arm 118 during rotation via a stop pin 132 carried thereon.

The wave springs 114 enable the disks 110 to float within the housing 100 better ensuring alignment with the teeth 134 and the cap 44. That is, there is some flexibility provided by the wave springs 114 to enable the disk 110 and the associated first and second arms 116, 118 to float both laterally and vertically. Thus, absolute precise alignment between the caps and the cap extractor 28 is not required for effective cap extraction.

The extraction jaw mechanism floats in a plane normal to the center axis of the jaws. This allows the central axis of the extractor jaws to move, if required, to be coincident with the axis of the electrode taper. This prevents a binding force between the taper surfaces that could otherwise be created during rotation when the two axis are not aligned. Increased surface friction due to binding may inhibit axial movement necessary to separate the electrode from the adapter. Such position variation may arise from inaccuracy of the positioner or by bending or deflection of the welding gun or its components. When the electrode is positioned by automation or an industrial robot, the electrode could be misaligned with the cap electrode extractor due to position teaching inaccuracy, positioning repeatability deviation, or deflection within the mechanical system.

The jaw mechanism floats in the direction of the taper axis. This permits the strain in the electrode and adapter tapers to aid in releasing the taper engagement. The intimate engagement of the tapers is maintained by stress on the material, which causes one or both of the components to deform. A female electrode cap taper for example will expand (stretch) slightly as its taper is engaged over the male taper of the electrode cap adapter. This strain applies a force on the two taper surfaces to lock them together. On a common ¾" (19 mm) diameter female electrode, the distance between initial engagement and locking of the tapers may be ¹⁄₁₆" (1.5 mm). Mounting of the extractor jaw mechanism between the wave springs 114 provides the electrode cap the freedom to move in the direction of the taper axis. By permitting this movement, when the electrode cap is rotated to break the static friction between taper surfaces, the strain on the taper helps to urge the tapers apart. This ensures the electrode is consistently released from the adapter.

Since the cap extractor 28 is accessible from either side it is not necessary to change the welding gun orientation for a single tool to extract either the upper or lower electrode.

Figure 13A:
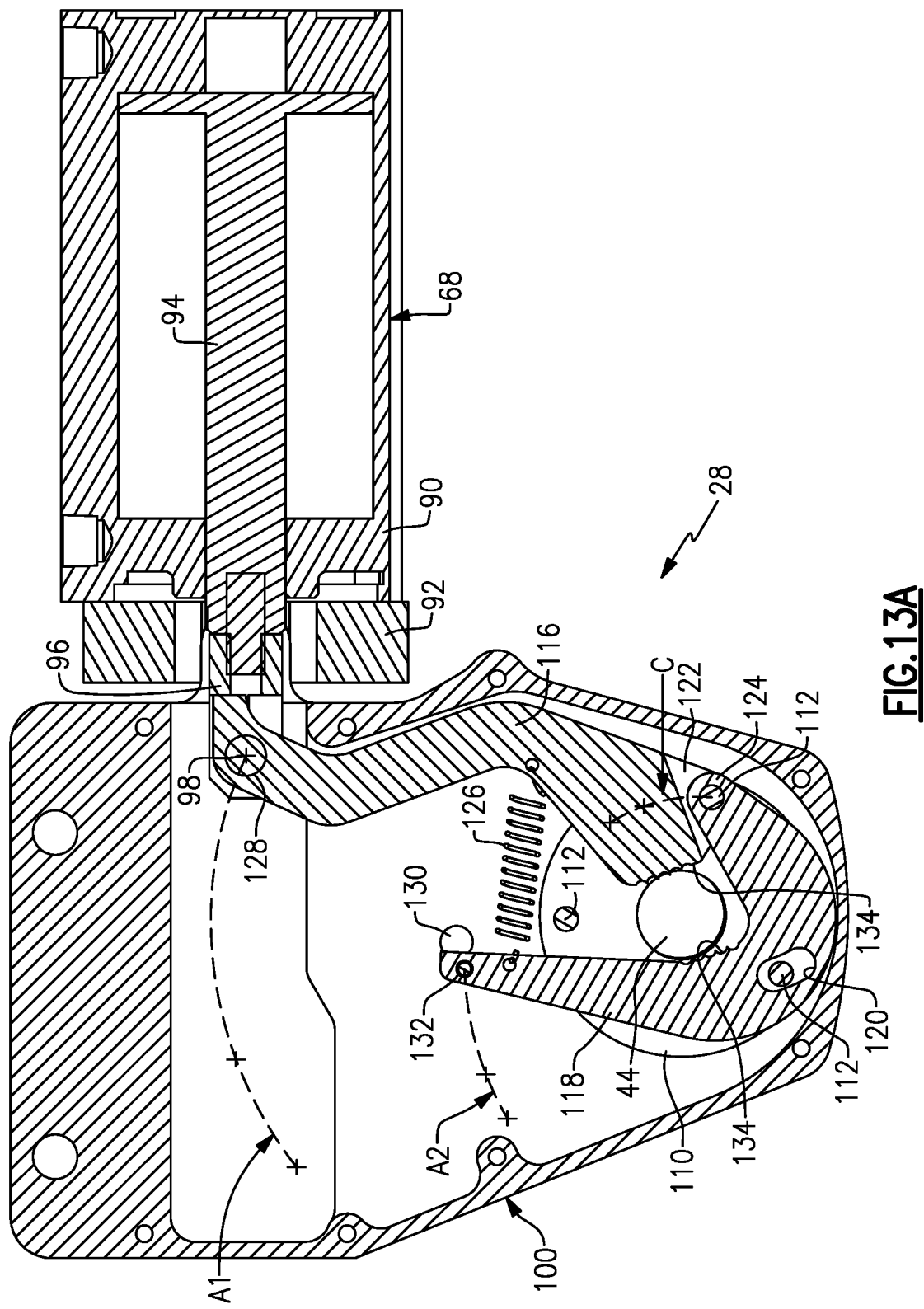
FIGS. 13A-13C are cross-sectional views along line 13-13 of FIG. 10 and, respectively, of first, second, and a third cap extracting positions.
Figure 13B:
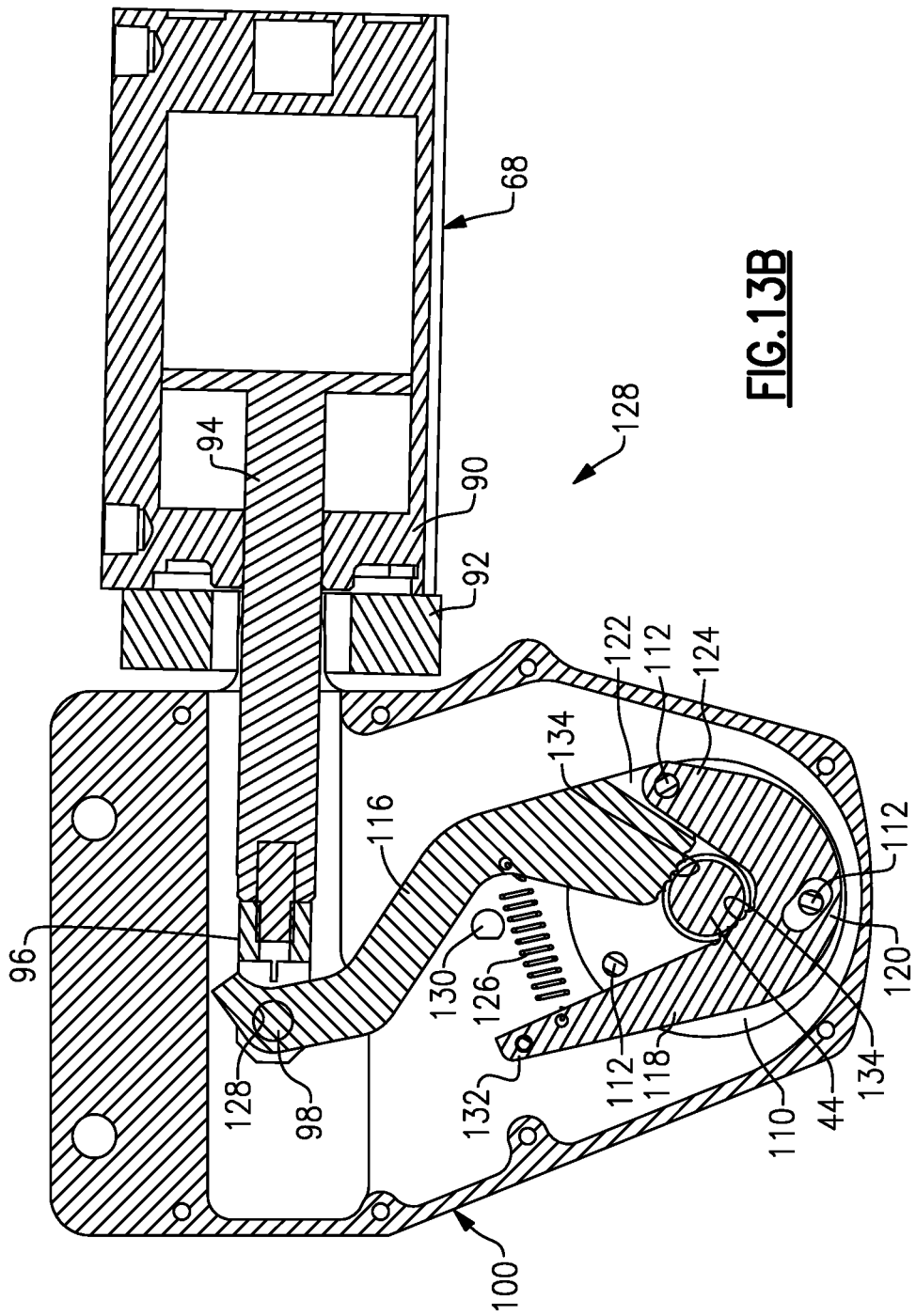
Figure 13C:
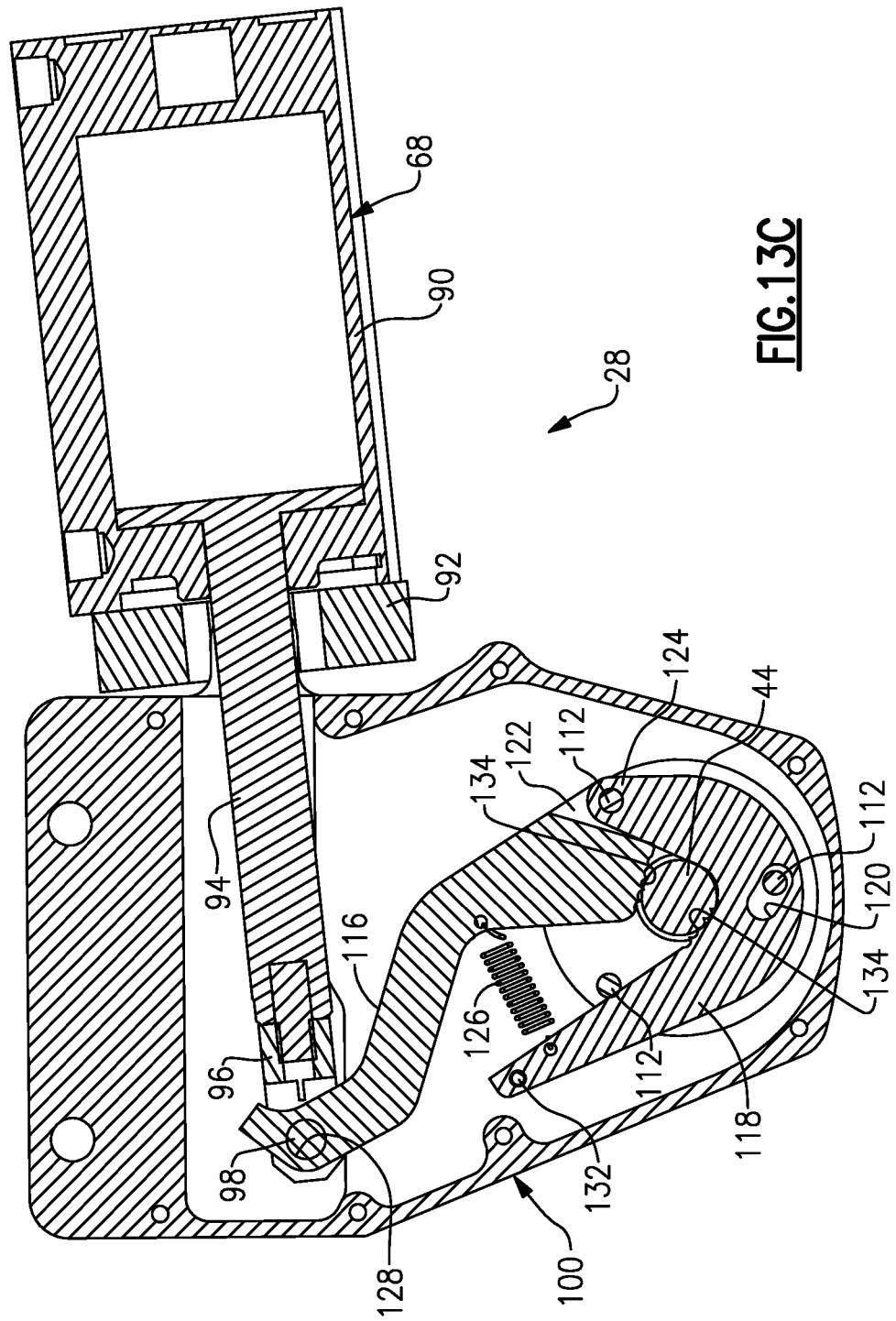

First, second, and third positions of the cap extractor are respectively illustrated in FIGS. 13A-13C. For better visualization, in FIG. 13A, the arcs A1 and A2 illustrate the path along which the pin 98 and stop pin 132 move during cap extraction. The spacer 112 interconnecting first and second arms 116, 118 move along a circular path C with the rotation of the disks 110. The "+" along these paths indicate the elements position in the first, second and third positions.

Referring to FIG. 13A, the extractor cylinder 68 is shown with the piston in a fully retracted position such that the first and second arm 116, 118 are maximally spaced with respect to one another to better facilitate accommodating the cap into the cap extractor. In this position, the stop pin 132 engages the stop 130. Once the cap 44 has been positioned between the teeth 134, the extractor cylinder 68 begins to close from the first position shown in FIG. 13A to the second position shown in FIG. 13B, which more tightly clamps the teeth 134 about the cap 44. In this second position, the stop pin 132 is spaced from the stop 130.

Referring to FIG. 13C, the extractor cylinder 68 is actuated to a fully extended position in which the first and second arms 116, 118 are further closed about the cap, finally releasing the cap 44 from its electrode adapter 40, 42. In this third position, the second arm 118 may engage one of the spacers 112, which was located between the first and second arms. Subsequently, the extractor cylinder 68 is retracted, which returns the first and second arms 116, 118 to the first position shown in FIG. 13A. In this position, once the electrode adapter 40, 42 has been moved with respect to the cap 44, the cap will simply drop into the bin 58 beneath.

The technique employed for extracting the electrode caps is simply a twisting motion to break the friction of the engaged tapers. When the cylinder advances, the serrated jaws of the extractor bite into the electrode cap to impart the rotation. The configuration of the jaw mechanism enables it to center to the electrode adapter taper, thereby ensuring the applied force is consistent even pressure on the serrations. Prior to the cylinder reaching the limit of rod extension, the cap will have been freed. When the cylinder retracts and the jaws reach the hard stops they will separate and allow the electrode cap to fall into the container provided. If cooling water is released when the cap is removed, it will also be captured by the bin 58.

Figure 14:
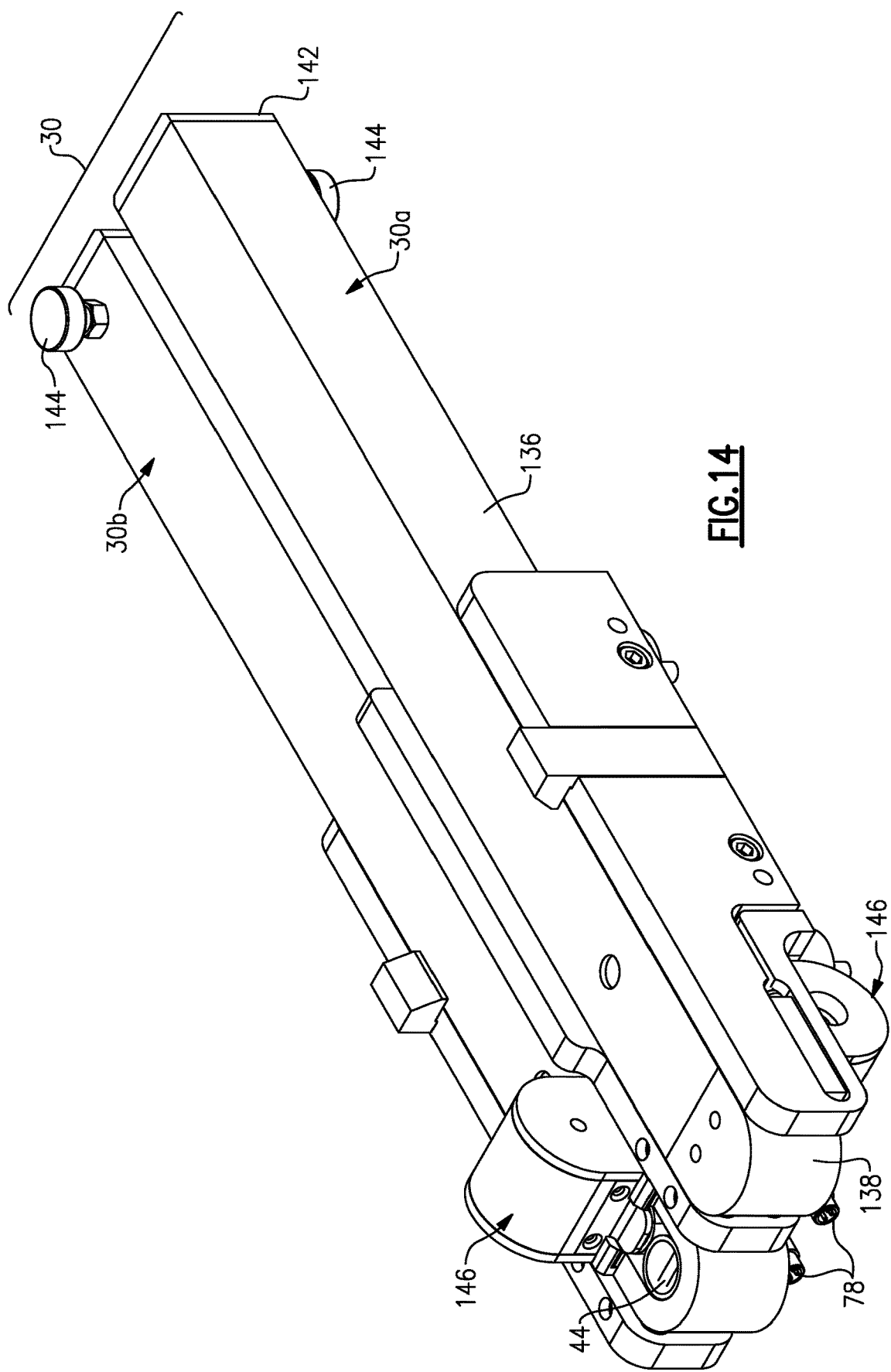
FIG. 14 is a perspective view of first and second cap dispensers.
Figure 15A:
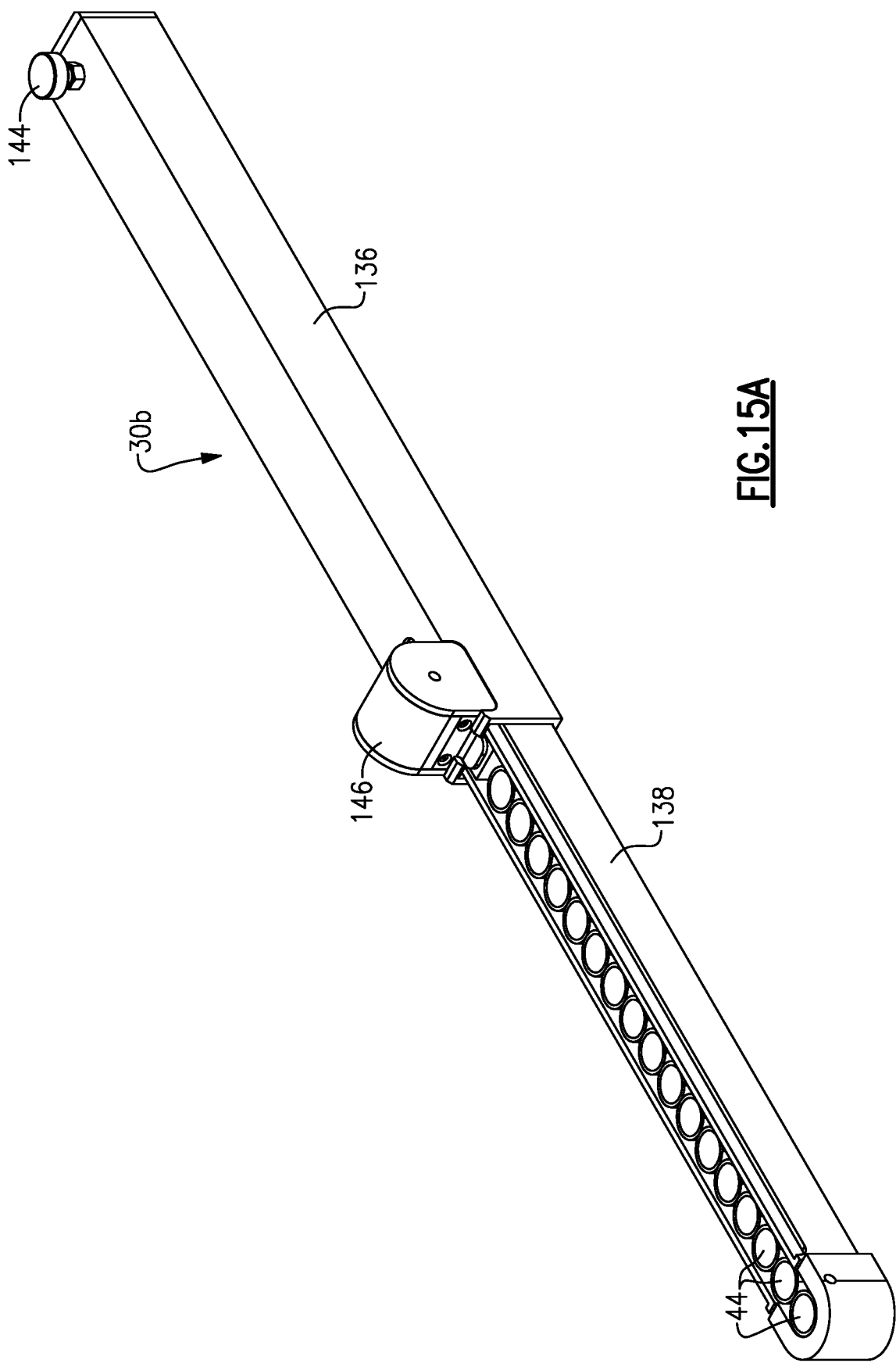
FIGS. 15A-15B, respectively, are views of a cap dispenser in extended and exploded positions.
Figure 15B:
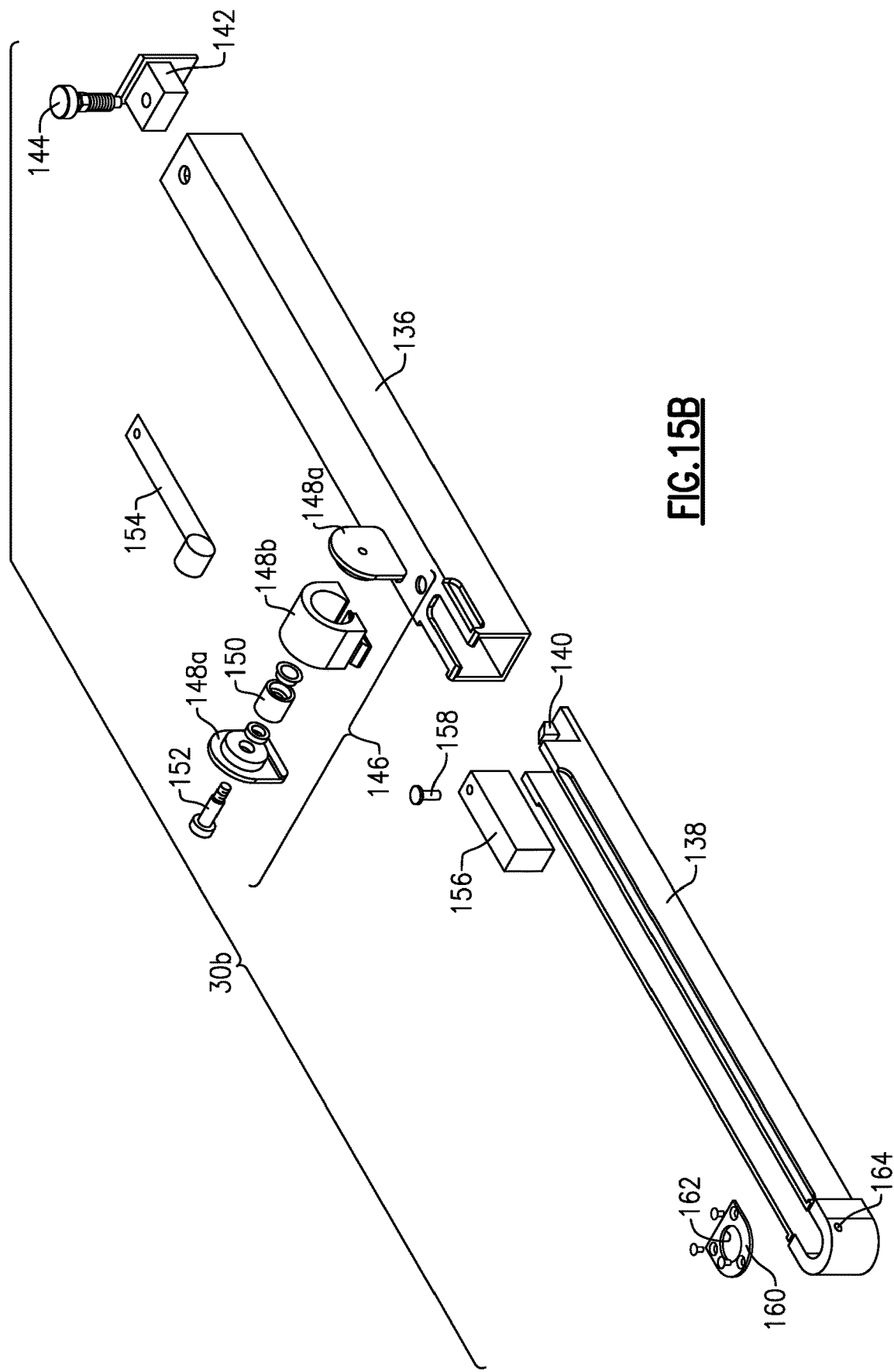
Figure 16:
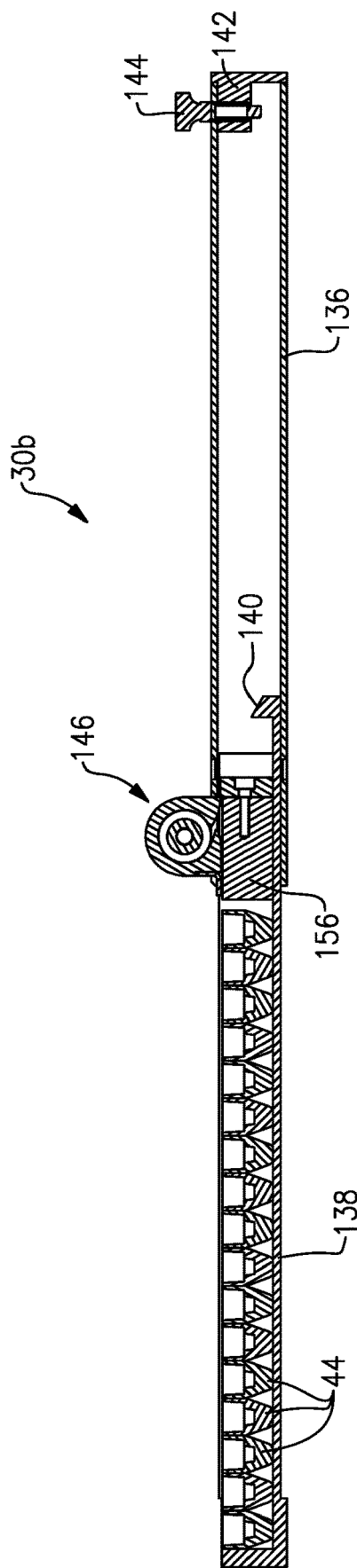
FIG. 16 is a cross-sectional view of the cap dispenser in an extended position.

The first and second cap dispensers 30A, 30B are illustrated in more detail in FIG. 14. In the example, the first cap dispenser 30A is in identical construction with respect to the second cap dispenser, only their orientation is different. Thus, the second cap dispenser 30B will be explained in further detail in connection with FIGS. 15A-17.

The process of installing a new cap is as simple as closing the welding gun onto the electrode cap. After the friction fit tapers engage, opening the welding gun easily overcomes the sliding friction between electrode caps to remove the electrode cap from the dispenser. As soon as the space occupied by the electrode cap is clear another electrode cap will move towards the outlet.

The cap dispenser is configured for off-line refilling and quick exchange. The dispenser can be made to a standard length or the length necessary to accommodate the number of electrode caps required between the standard service intervals.

The dispenser is easily removed from its holder by pulling the spring loaded catch. The dispenser is easily serviced in a similar fashion by pulling the spring loaded catch. There is no cumbersome on-line dispenser loading or replacement process required so dispensers can be loaded off line. This also has the added advantage of easily enabling different electrode caps to be installed in the dispenser when required by a different workpiece or welding condition.

A sleeve 136 slideably receives a drawer 138 that houses the caps 44. The drawer 138 includes a ramp 140 that selectively cooperates with a pin 144 carried by an end cap 142 mounted to the sleeve. The pin 144 may be spring loaded to bias the pin 144 inward to engage the ramp 140 when the drawer is fully inserted and seated with respect to the sleeve 136. Alternatively, the pin 144 may be threadingly moved into and out of an engagement with respect to the ramp 140. The dispenser is easy to load since the tray can be fully opened or partially opened for filling, depending on which method is easiest for a particular size and geometry of welding electrode.

Figure 17:
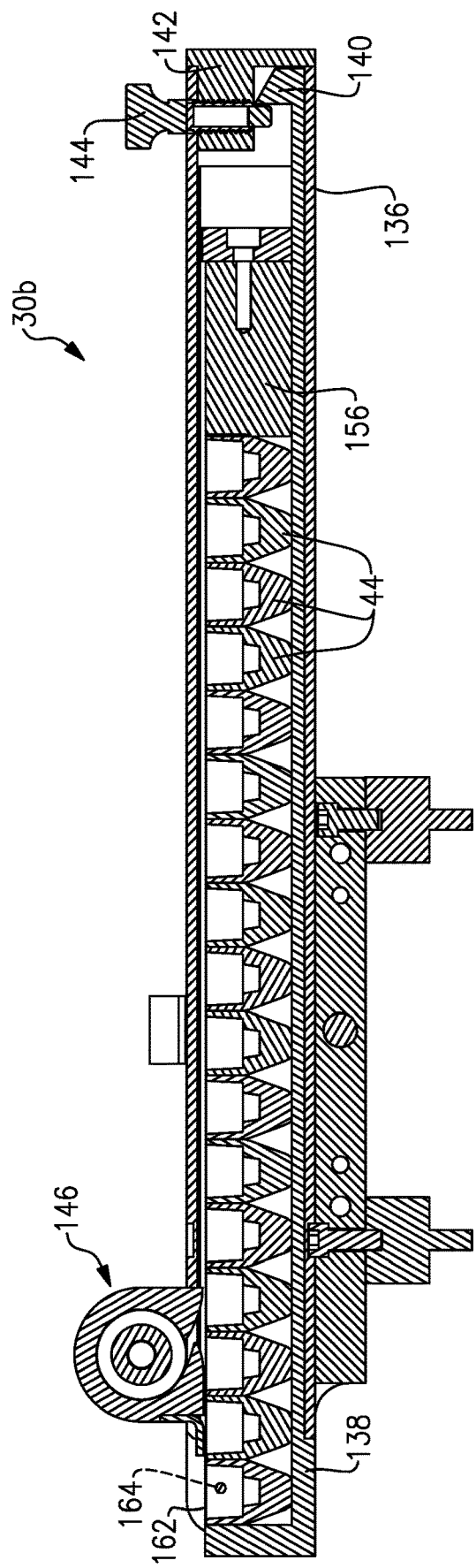
FIG. 17 is a cross-sectional view of the cap dispenser in a closed position.

Electrode caps are urged towards the outlet of the dispenser by a follower, which is pulled by a constant force spring. A spring assembly 146 is mounted to the sleeve 136 to urge a slide block 156 located within the drawer 138 in a direction that forces the caps 44 to a position beneath an aperture 162 in a plate 160. In an example, the spring assembly 146 includes a spring housing 148 having first and second housing portions 148A, 148B. The spring housing 148 receives a drum 150 rotatable about a roller pin 152 that secures the housing portions 148A, 148B to one another. A clock spring 154 is affixed to the drum 150 at one end and to the slide block 156 at an opposite end by a fastener 158. The clock spring 154 wraps about the drum 150 in a normally biased position. Thus, the slide block 156 is pulled leftward as illustrated in FIG. 17 to push the stack of caps 44 toward the aperture 162.

The presence of the cap at the outlet is verified by a sensor, which confirms the straight side of the electrode cap skirt is tight against the stop. A through beam light sensor is provided to ensure there is a properly oriented electrode cap at the discharge point. A fiber optic through-beam light sensor is referenced, but other sensors can be employed. The sensor has the secondary function of verifying there is an electrode cap in the dispenser since the follower is configured so it will not operate or activate the electrode cap detection sensor.

Referring to FIG. 18, the drawer 138 includes a hole 164 that may cooperate with the cap presence detector 78, which may be a laser. If a cap 44 is oriented improperly such that the hole 164 is obstructed, a fault condition may be indicated requiring the cap dispenser to be serviced.

The disclosed arrangement uses a simple mechanical system to pivot the welding gun to move the electrodes out of the work area of the welding cell. Stand-alone electrode maintenance tools and simple translation stages achieve a total solution that is easy to expand, more economical, and easier to maintain. Because the maintenance tools do not have a footprint within the robot envelope, they do not affect or require any of the reach of the robot. The maintenance tools are not exposed to the hazards and contamination found within the welding cell. The robot cell is not exposed to the hazards and contamination that may occur at the maintenance tools. The maintenance tools may be made accessible for service while the robot is cycling.

The maintenance tools are moved to defined positions so there is no requirement for position variation compensation schemes, such as spring centered slides, which can contribute to erratic machining results in the prior art due to chattering.

Movement in the plane perpendicular to the taper axis minimizes the possibility a side force could be applied to the taper surfaces, which could inhibit the taper separation. Movement in the direction of the taper axis ensures the tapers can separate without the need for external force or movement.

The design includes a simple round orifice that is less sensitive to electrode geometry variation such as the diameter or surface condition of the electrode cap. It also does not rely on the accessible surface of the taper or of electrode. The design is much simpler than others which employ shafts, gears, cams, and motors. This reduces the cost and improves the operational reliability.

The linear dispensers can be made to accommodate a variety of electrode cap sizes. Spring loaded pins are employed to latch the linear dispenser into its holder and to retain the drawer in the closed position. Therefore, the functions of filling and replacing the dispenser may be easy accomplished independently.

Filling may be performed off line if desired. During filling, the dispenser can be held at an orientation that best exploits gravity to aid the process. The length of the exposed opening during loading can also be coordinated to minimize the opportunity for electrodes to tip over, if their geometry predisposes them to do so. The action of closing of the dispenser, applies spring pressure that will be used to urge the cap electrodes towards the opening.

Replacement of the dispenser can be performed to minimize interaction time or for convenience. It can also be done to change the electrode geometry if a changeover is performed to enable the robot cell to produce different weldments.

It should also be understood that although a particular component arrangement is disclosed in the illustrated embodiment, other arrangements will benefit herefrom. Although particular step sequences are shown, described, and claimed, it should be understood that steps may be performed in any order, separated or combined unless otherwise indicated and will still benefit from the present invention.

Although the different examples have specific components shown in the illustrations, embodiments of this invention are not limited to those particular combinations. It is possible to use some of the components or features from one of the examples in combination with features or components from another one of the examples.

Although an example embodiment has been disclosed, a worker of ordinary skill in this art would recognize that certain modifications would come within the scope of the claims. For that reason, the following claims should be studied to determine their true scope and content.

What is claimed is:

1. A cap extractor for a welding gun comprising:
a housing;
a pair of springs; and
first and second arms arranged between the springs, each of the first and second arms having teeth configured to engage a welding cap, the first and second arms configured to move relative to the housing by deflecting the springs, the first and second arms are mounted to spaced apart disks, wherein an actuator is pivotally attached to the housing, the actuator operatively connected to the first arm to rotate the first and second arms along with the disks, the actuator configured to articulate relative to the housing during rotation of the first arm in the housing.

2. A cap extractor for a welding gun comprising:
a housing;
a pair of springs; and
first and second arms arranged between the springs, each of the first and second arms having teeth configured to engage a welding cap, the first and second arms configured to move relative to the housing by deflecting the springs, wherein the first and second arms are mounted to spaced apart disks, the first and second arms pivotally connected to one another by a spacer pin that rotationally affixes the disks to one another.

3. The cap extractor of claim 2, wherein the springs are wave springs, each wave spring received in a recess of one of the disks, and a collar is arranged between each disk and the housing to locate a respective wave spring relative to the housing.

4. A cap extractor for a welding gun comprising:
a housing;
a pair of springs; and
first and second arms arranged between the springs, each of the first and second arms having teeth configured to engage a welding cap, the first and second arms configured to move relative to the housing by deflecting the springs, wherein a biasing spring is interconnected to the first and second arms to urge the teeth of the first and second arms toward one another.

5. A method of removing a cap from a welding gun comprising the steps of:
receiving a welding cap having a centerline between teeth of first and second arms, wherein the first and second arms are supported between spaced apart disks, the disks are supported by springs;
floating the arms along the centerline and laterally relative to the centerline during the receiving step to permit alignment between the teeth and the welding cap, and the floating step includes deflecting at least one of the springs along the centerline; and
twisting the welding cap from a welding gun.

6. A method of removing a cap from a welding gun comprising the steps of:
receiving a welding cap having a centerline between teeth of first and second arms, wherein one of the first and second arms abuts a stop preceding the receiving step;
floating the arms along the centerline and laterally relative to the centerline during the receiving step to permit alignment between the teeth and the welding cap; and
twisting the welding cap from a welding gun, and the one of the first and second arms is spaced from the stop during the twisting step.

7. The method of claim 6, comprising the step of normally biasing the first and second arms toward one another, and the receiving step separates the first and second arms.

8. A method of removing a cap from a welding gun comprising the steps of:
receiving a welding cap having a centerline between teeth of first and second arms;
floating the arms along the centerline and laterally relative to the centerline during the receiving step to permit alignment between the teeth and the welding cap; and
twisting the welding cap from a welding gun, wherein an actuator is pivotally mounted to a housing containing the first and second arms, and the twisting step includes articulating the actuator relative to the housing and rotating the first and second arms relative to the welding gun.

9. The cap extractor of claim 3, wherein the wave springs are configured to permit the discs to float laterally with respect to the housing enabling the first and second arms to float laterally relative to the housing.

10. The cap extractor of claim 3, wherein the wave springs are configured to permit the discs to float vertically with respect to the housing enabling the first and second arms to float vertically relative to the housing.

11. The cap extractor of claim 1, wherein the housing includes a first aperture one side and a second aperture on an opposite side of the one side, the first and second apertures configured to receive first and second weld caps arranged opposite one another on a weld gun.

12. The cap extractor of claim 2, wherein additional spacer pins separate and affix the disks to one another, one of the additional spacers received in a slot in the second arm.

13. The cap extractor of claim 2, wherein the housing includes a stop configured to limit the travel of the second arm during rotation via a stop pin carried on the second arm.

14. A cap extractor for a welding gun comprising:
a housing;
spaced apart disks arranged in the housing;
first and second arms arranged between and mounted to the disks, the first and second arms are pivotably secured with respect to one another by a spacer pin and carried by the disks for rotation about a circular path, each of the first and second arms having teeth configured to engage a welding cap;
a spring arranged between each of the disks and the housing, wherein each spring received in a recess of one of the disks, wherein the springs are configured to enable the discs to float laterally and vertically with respect to the housing enabling the first and second arms to float laterally and vertically relative to the housing, thereby ensuring alignment with the teeth and a weld cap; and
an actuator is pivotally attached to the housing, the actuator operatively connected to the first arm to rotate the first and second arms along with the disks, the actuator configured to articulate relative to the housing during rotation of the first arm in the housing.

* * * * *